United States Patent
Colletti et al.

(10) Patent No.: US 12,458,017 B2
(45) Date of Patent: *Nov. 4, 2025

(54) CONTAINERIZED LIQUID FORMULATIONS

(71) Applicant: Monsanto Technology LLC, St. Louis, MO (US)

(72) Inventors: Ronald Francis Colletti, Wildwood, MO (US); Shaun Raj Selness, Chesterfield, MO (US); Daniel James Seyer, Ballwin, MO (US)

(73) Assignee: Monsanto Technology LLC, St. Louis, MO (US)

( * ) Notice: Subject to any disclaimer, the term of this patent is extended or adjusted under 35 U.S.C. 154(b) by 436 days.

This patent is subject to a terminal disclaimer.

(21) Appl. No.: 17/388,453

(22) Filed: Jul. 29, 2021

(65) Prior Publication Data
US 2021/0352891 A1 Nov. 18, 2021

Related U.S. Application Data

(62) Division of application No. 15/908,296, filed on Feb. 28, 2018, now Pat. No. 11,089,776.

(60) Provisional application No. 62/464,858, filed on Feb. 28, 2017, provisional application No. 62/464,854, filed on Feb. 28, 2017.

(51) Int. Cl.
| | | |
|---|---|---|
| *A01N 25/04* | (2006.01) | |
| *B01F 23/43* | (2022.01) | |
| *B01F 27/113* | (2022.01) | |
| *B01F 27/88* | (2022.01) | |
| B01F 101/04 | (2022.01) | |

(52) U.S. Cl.
CPC .............. *A01N 25/04* (2013.01); *B01F 23/43* (2022.01); *B01F 27/113* (2022.01); *B01F 27/88* (2022.01); B01F 2101/04 (2022.01)

(58) Field of Classification Search
CPC ....... A01N 25/04; B01F 23/43; B01F 27/113; B01F 27/88; B01F 2101/04
See application file for complete search history.

(56) References Cited

U.S. PATENT DOCUMENTS

| | | | |
|---|---|---|---|
| 3,856,274 A * | 12/1974 | Stevenson | A01M 7/0085 |
| | | | 220/DIG. 25 |
| 4,536,207 A | 8/1985 | McCandliss et al. | |
| 5,549,718 A | 8/1996 | Lerouge et al. | |
| 5,702,752 A | 12/1997 | Gugger et al. | |
| 5,965,545 A | 10/1999 | Ben-Shalom et al. | |
| 5,990,291 A | 11/1999 | Waggle et al. | |
| 6,146,668 A | 11/2000 | Kelly et al. | |
| 2006/0158958 A1* | 7/2006 | Romanik | A47J 43/0465 |
| | | | 366/205 |

FOREIGN PATENT DOCUMENTS

| | | | |
|---|---|---|---|
| JP | 09124403 A | * | 5/1997 |
| JP | H09-124403 A | | 5/1997 |
| WO | 2005063784 A1 | | 7/2005 |
| WO | 2007117500 A2 | | 10/2007 |
| WO | 2008071674 A2 | | 6/2008 |

OTHER PUBLICATIONS

Akoijam et al. Bull Environ Contam Toxicol. 2014; 92: 609-615. (Year: 2014).*
Cottaz, S., et al., "Genetic Engineering of *Escherichia coli* for the Production of N1, N11-Diacetylchitobiose (Chitinbiose) and its Utilization as a Primer for the Synthesis of Complex Carbohydrates," 2005, Metabolic Engineering 7:311-317.
D'Haeze, W., et al., "Nod Factor Structures, Responses, and Perception During Initiation of Nodule Development," 2002, Glycobiology, 12/6:79R-105R, 27 pages.
Demont-Caulet, N., et al., "Nodule-Inducing Activity of Synthetic Sinorhizobium meliloti Nodulation Factors and Related Lipo-Chitooligosaccharides on Alfalfa. Importance of the Acyl Chain Structure," 1999, Plant Physiology, 120:83-92, 10 pages.
Dénarié, J., et al., "Rhizobium Lipo-Chitooligosaccharide Nodulation Factors: Signaling Molecules Mediating Recognition and Morphogenesis," 1996, Ann. Rev. Biochem., 65:503-535, Abstract Only, 1 page.
Diaz, C.L., et al., "Heterologous Rhizobial Lipochitin Oligosaccharides and Chitin Oligomers Induce Cortical Cell Divisions in Red Clover Roots, Transformed with the Pea Lectin Gene," 2000, Mol. Plant-Microbe Interactions,13/3:268-276, 9 pages.
Hamel, L.P., et al., "Chitooligosaccharide Sensing and Downstream Signaling: Contrasted Outcomes in Pathogenic and Beneficial Plant-Microbe Interactions," 2010, Planta, 232/4:787-806, Abstract Only, 1 page.
Hungria, M., et al., "Molecular Signals Exchanged Between Host Plants and Rhizobia: Basic Aspects and Potential Application in Agriculture," 1997, Soil Biol. Biochem., 29/5-6:819-830, 12 pages.
Jain, V., et al., "Plant Flavonoids: Signals to Legume Nodulation and Soil Microorganisms," 2002, J. Plant Biochemistry & Biotechnology, 11:1-10, 10 pages.
McCoy, C.W., et al., "Entomogenous Fungi," 1985, vol. V: Microbial Insecticides, Part A, CRC Handbook of Natural Pesticides, pp. 151-236, 86 pages.
Müller, J., et al., "Nod Factors and Chitooligomers Elicit an Increase in Cytosolic Calcium in Aequorin-Expressing Soybean Cells," 2000, Plant Physiology, 124:733-739, 7 pages.
Pochanavanich, P., et al., "Fungal Chitosan Production and its Characterization," 2002, Letters in Applied Microbiology, 35:17-21, 5 pages.

(Continued)

*Primary Examiner* — David Browe
(74) *Attorney, Agent, or Firm* — Stinson LLP

(57) ABSTRACT

Provided herein are containerized liquid formulations comprising a plurality of agrochemicals. The formulations comprise a plurality of parallel liquid layers, wherein each layer is disposed within the container such that it is in contact with at least one adjacent layer at an interface. Also provided are methods of preparing, storing, shipping, and using the containerized liquid formulations.

13 Claims, 15 Drawing Sheets

(56) References Cited

OTHER PUBLICATIONS

Promé, J-C et al., "Acylated Chitooligomers are Molecular Signals that Mediate the Symbiotic Interactions Between Nitrogen-Fixing Bacteria and Their Host Plants," 1998, Pure & Appl. Chem., 70/1:55-60, 6 pages.

Ralston, L., et al., "Partial Reconstruction of Flavonoid and Isoflavonoid Biosynthesis in Yeast Using Soybean Type I and Type II Chalcone Isomerases," 2005, Plant Physiology, 137:1375-1388, 14 pages.

Robina, I., et al., "Synthesis and Biological Evaluation of Oligosaccharides Related to the Molecule Signals in Plant Defence and the Rhizobium-Legume Symbiosis," 2002, Tetrahedron 58:521-530, 10 pages.

Rougé, P., et al., "Chapter 27—Docking of Chitin Oligomers and Nod Factors on Lectin Domains of the LysM-RLK Receptors in the Medicago-Rhizobium Symbiosis," 2011, The Molecular Immunology of Complex Carbohydrates-3, Advances in Experimental Medicine and Biology 705, A.M. Wu, Editor, pp. 511-521, 11 pages.

Samain, E., et al., "Gram-Scale Synthesis of Recombinant Chitooligosaccharides in *Escherichia coli*," 1997, Carbohydrate Research, 302:35-42, 8 pages.

Samain, E., et al., "Production of O-Acetylated and Sulfated Chitooligosaccharides by Recombinant *Escherichia coli* Strains Harboring Different Combinations of Nod Genes," 1999, J. of Biotech, 72:33-47.

Shaw, L.J., et al., "Perception and Modification of Plant Flavonoid Signals by Rhizosphere Microorganisms," 2006, Environmental Microbiology, 8/11:867-1880, 14 pages.

Spaink, H.P., "Root Nodulation and Infection Factors Produced by Rhizobial Bacteria," 2000, Annual Rev. Microbiol., 54:257-288, 34 pages.

Van Der Holst, P., et al., Proteins Involved in the Production and Perception of Oligosaccharides in Relation to Plant and Animal Development, 2001, Curr. Opin. Struc. Biol., 11:608-616, 9 pages.

Wang, X., et al., "Genome-Wide and Organ-Specific Landscapes of Epigenetic Modifications and Their Relationships to mRNA and Small RNA Transcriptomes in Maize," 2009, The Plant Cell, 21:1053-1069, 18 pages.

De Faria, M.R., et al., "Mycoinsecticides and Mycoacaricides: A Comprehensive List with Worldwide Coverage and International Classification of Formulation Types," 2007, Biological Control, 43:237-256.

Akoijam, R., et al. "Persistence and Metabolism of Imidacloprid in Rice", 2014, Bull. Environ. Contam. Toxicol, 92:609-615.

\* cited by examiner

CONTAINERIZED LIQUID FORMULATIONS

REFERENCE TO RELATED APPLICATIONS

This application is a division of U.S. patent application Ser. No. 15/908,296, filed Feb. 28, 2018, and claims the benefit of U.S. Provisional Application Nos. 62/464,858, filed Feb. 28, 2017 and 62/464,854, filed Feb. 28, 2017, the entire contents of which are incorporated herein by reference.

FIELD

Provided herein are containerized liquid formulations comprising a plurality of agrochemicals. The formulations comprise a plurality of parallel liquid layers.

BACKGROUND

Numerous methods of formulating agrochemicals for storage and shipping are known in the art. For example, water-soluble agrochemicals can be formulated as aqueous solution concentrate compositions. Water-insoluble agrochemicals can be formulated as emulsion concentrates, microemulsion concentrates, suspension concentrates, or even as a solution concentrate in an organic solvent.

While successfully formulating a given agrochemical can be challenging, the difficulty is often much greater when the formulation includes a second active ingredient. Low active loading limitations and poor compositional stability may result in problems such as the formation of two or more phases, or crystallization of one or more of the actives from the composition.

When multiple active ingredients are present in the formulation, both the complexity and the difficulty of preparing a stable formulation increase exponentially. This problem is particularly acute in the field of seed treatment mixtures, which often comprise three, four, or more agrochemicals.

In many cases, each seed treatment agrochemical is first formulated individually, for example as a suspension concentrate formulation. The resulting formulated agrochemicals are then combined to form a seed treatment mixture, which can be used to prepare treated seeds. Unfortunately, the interactions between the various agrochemicals and formulation components present in a seed treatment mixture can be complex and unpredictable, and can result in a seed treatment mixture that is unstable when stored for more than a short period of time.

Accordingly, there is a need in the art for the provision of liquid formulations comprising multiple formulated agrochemicals that are storage-stable. In particular, it is desirable to provide a method of preparing storage-stable mixtures of agrochemical formulations (e.g., suspension concentrate formulations). It is also desirable that such a storage-stable mixture be suitable for shipping using standard commercial shipping methods.

SUMMARY

For example, provided herein is a containerized liquid formulation comprising a plurality of agrochemicals, the formulation comprising a plurality of parallel liquid layers comprising at least a first layer comprising a first agrochemical, and a second layer comprising a second agrochemical, said plurality of parallel liquid layers being disposed within the container such that each layer is in contact with at least one adjacent liquid layer at a substantially horizontal interface.

Also provided herein is a method of preparing a containerized liquid formulation comprising a plurality of agrochemicals, the method comprising adding a first liquid composition comprising a first agrochemical to a container, thereby forming a first liquid layer disposed within the container; and subsequently adding a second liquid composition comprising a second agrochemical to the container, thereby forming a second liquid layer disposed within the container, such that the first liquid layer and the second liquid layer are substantially parallel to one another, and such that the first and second layers are each in contact with at least one adjacent liquid layer at a substantially horizontal interface.

Also provided herein is a containerized liquid formulation prepared according to a method as described herein.

Also provided herein is a storage container comprising a liquid formulation prepared as described herein.

Also provided herein is a method of storing and shipping a liquid agrochemical formulation comprising a plurality of agrochemicals, the method comprising filling a storage container with the liquid formulation as described herein; loading the storage container into an enclosed volume in or on a road or rail vehicle or water-borne vessel in a loading location; and causing the vehicle or vessel after loading into an enclosed volume to move from the loading location to an unloading location.

Also provided herein is a method of storing and shipping a liquid agrochemical formulation comprising a plurality of agrochemicals, the method comprising: filling a storage container with a liquid formulation using a method as described herein; loading the storage container into an enclosed volume in or on a road or rail vehicle or water-borne vessel in a loading location; and causing the vehicle or vessel after loading into an enclosed volume to move from the loading location to an unloading location.

Also provided herein is a method of preparing a treated seed, the method comprising mixing a liquid formulation as described herein to provide a homogeneous seed treatment mixture; and applying the homogenous seed treatment mixture to a seed.

Other objects and features will be in part apparent and in part pointed out hereinafter.

DETAILED DESCRIPTION

Figure 1:
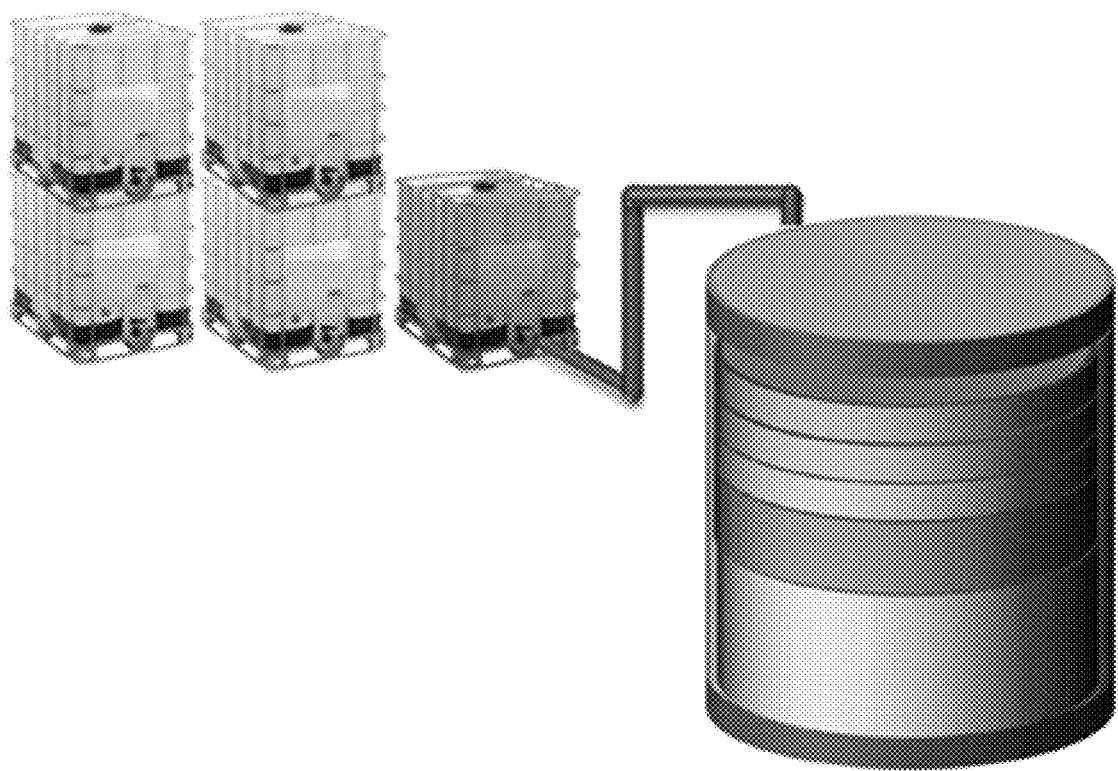
FIG. 1 is a conceptual illustration of a containerized formulation as described herein comprising a plurality of parallel layers.
Figures 2A, 2B, 2C:
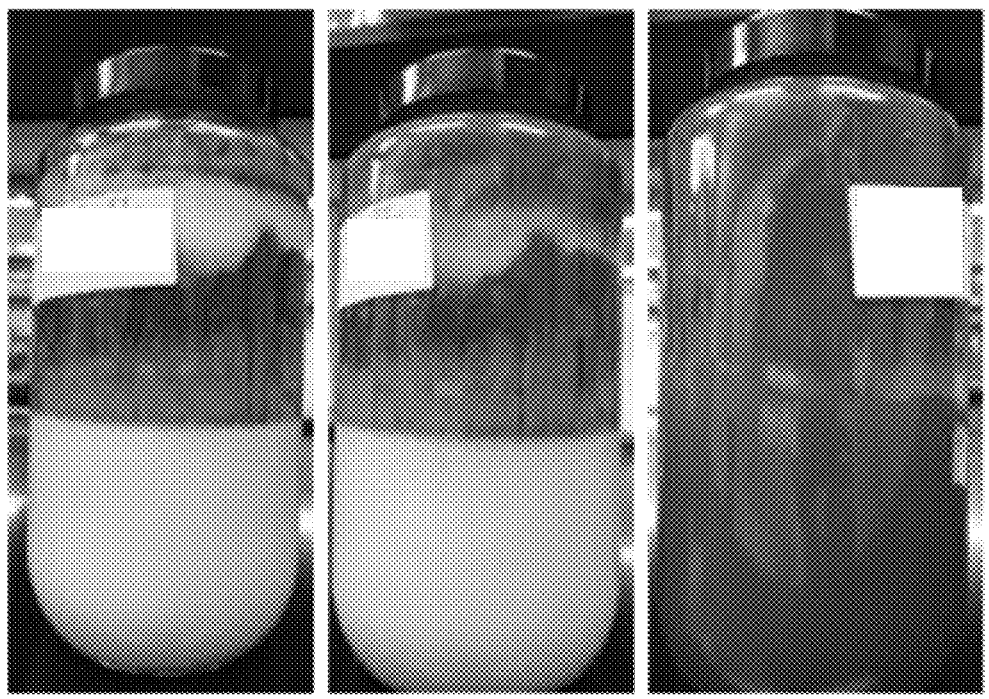
FIGS. 2A, 2B, and 2C present photographs of Fungicide+Insecticide test formulations taken immediately after preparation. The formulations were prepared using a density-based order of addition and subjected to static (FIG. 2A), tipped (FIG. 2B), and mixed (FIG. 2C) mixing procedures respectively, as described in Example 2.
Figures 3A, 3B, 3C:
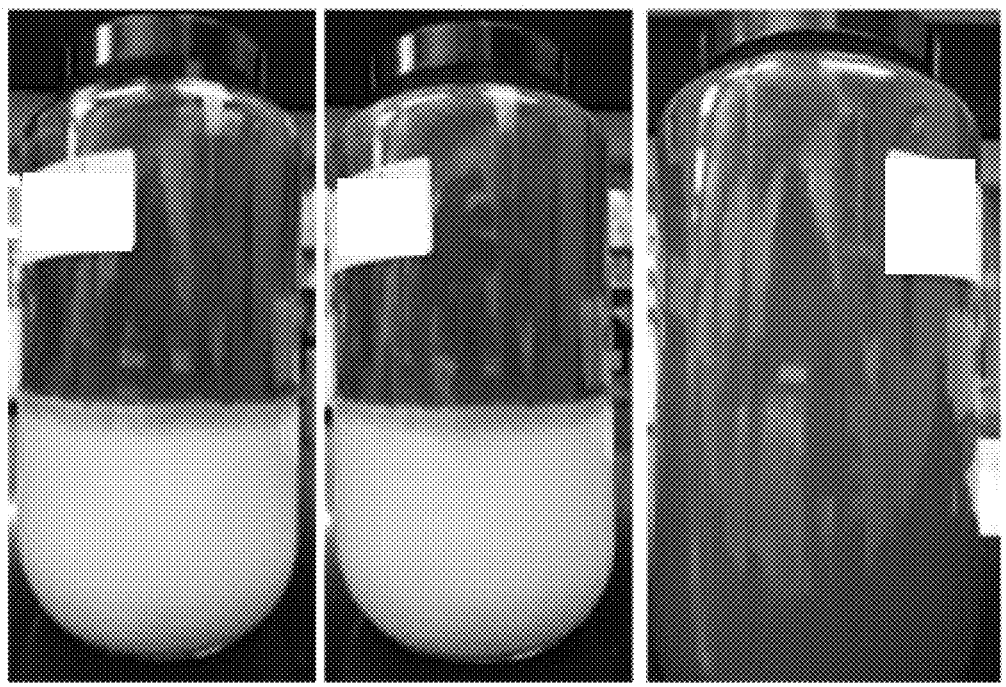
FIGS. 3A, 3B, and 3C present photographs of Fungicide+Insecticide test formulations taken immediately after preparation. The formulations were prepared using a conventional order of addition and subjected to static (FIG. 3A), tipped (FIG. 3B), and mixed (FIG. 3C) mixing procedures respectively, as described in Example 2.
Figure 4:
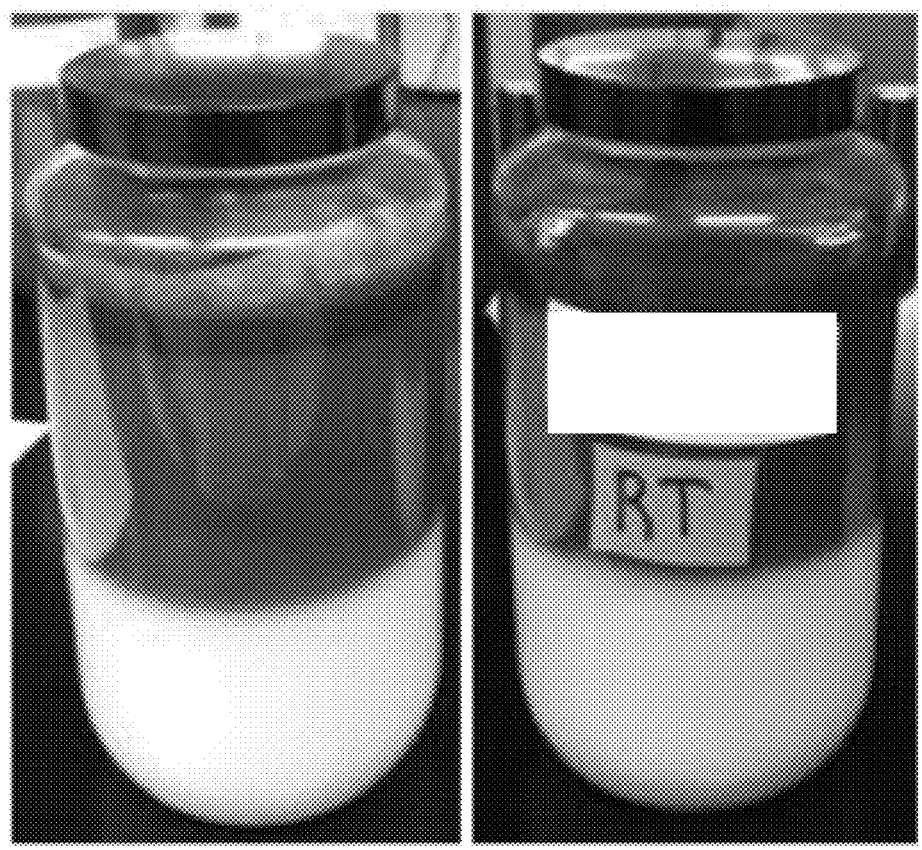
FIG. 4 presents two photographs of a Fungicide+Insecticide test formulation prepared using a conventional order of addition and taken 60 days after storage under ambient conditions, as described in Example 2. The formulation was not mixed prior to the photograph.
Figure 5:
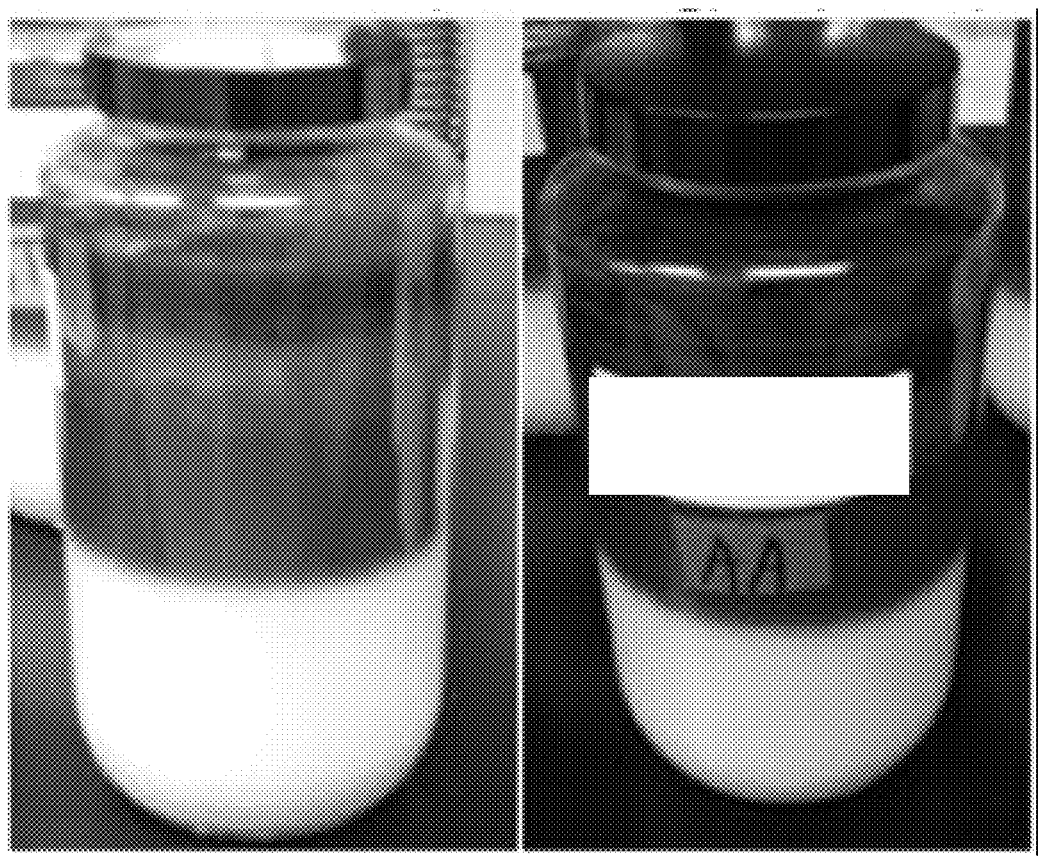
FIG. 5 presents two photographs of a Fungicide+Insecticide test formulation prepared using a conventional order of addition and taken 60 days after storage under accelerated aging conditions, as described in Example 2. The formulation was not mixed prior to the photograph.
Figure 6:
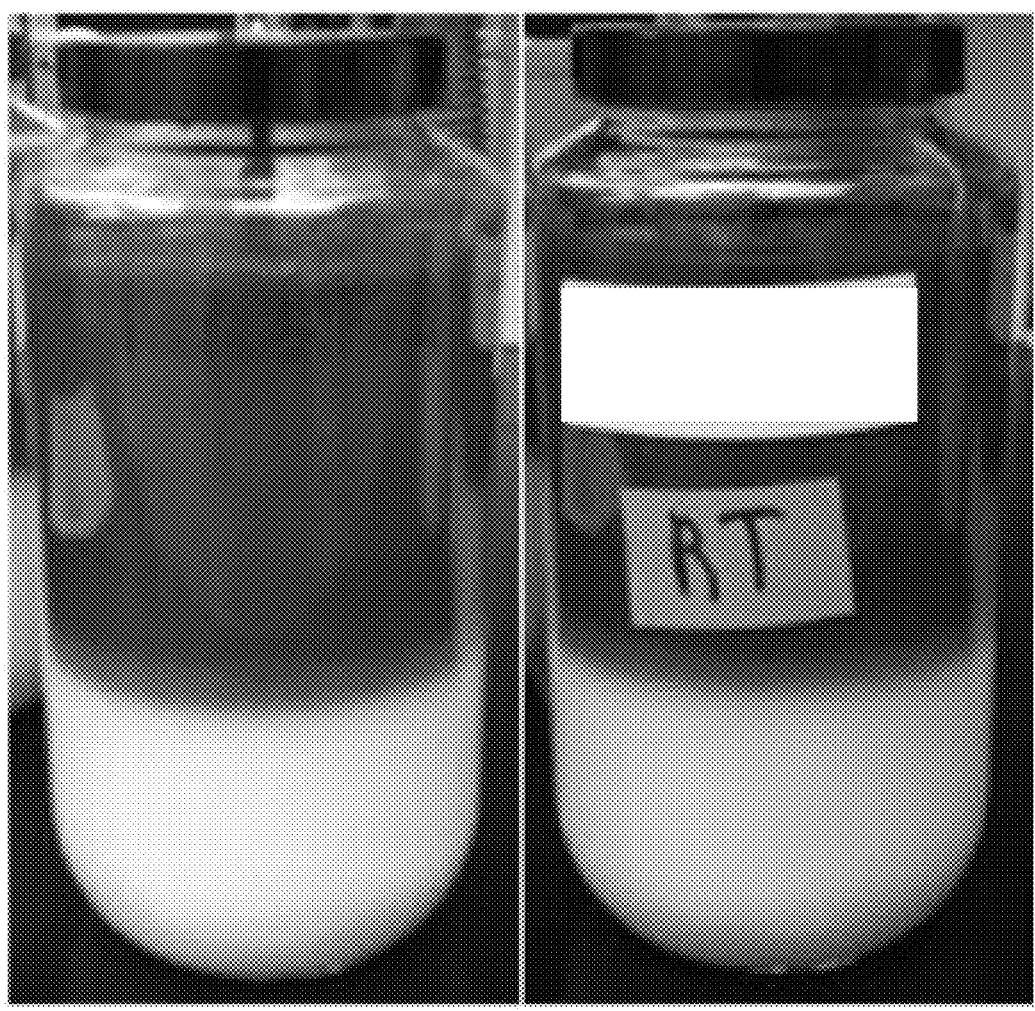
FIG. 6 presents two photographs of a Fungicide+Insecticide test formulation prepared using a density-based order of addition and taken 60 days after storage under ambient conditions, as described in Example 2. The formulation was not mixed prior to the photograph.
Figure 7:
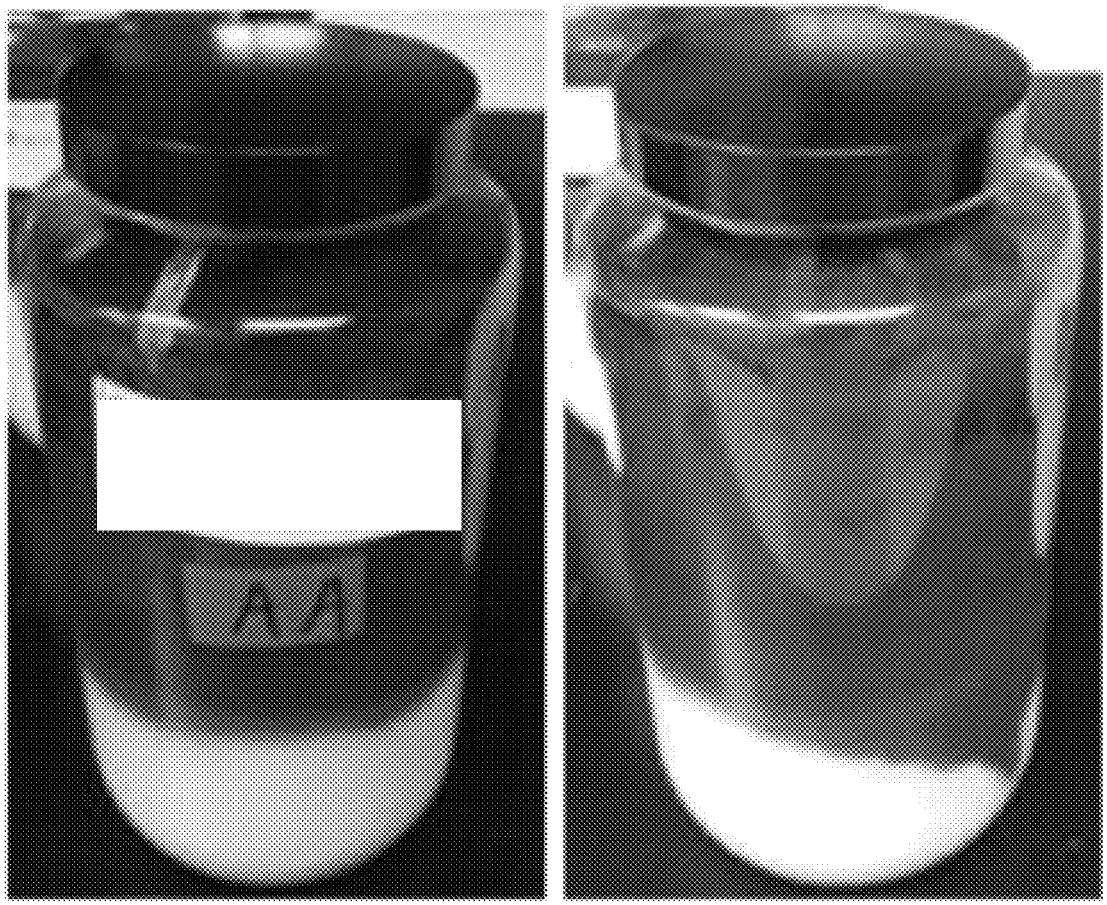
FIG. 7 presents two photographs of a Fungicide+Insecticide test formulation prepared using a density-based order of addition and taken 60 days after storage under accelerated aging conditions, as described in Example 2. The formulation was not mixed prior to the photograph.
Figure 8:
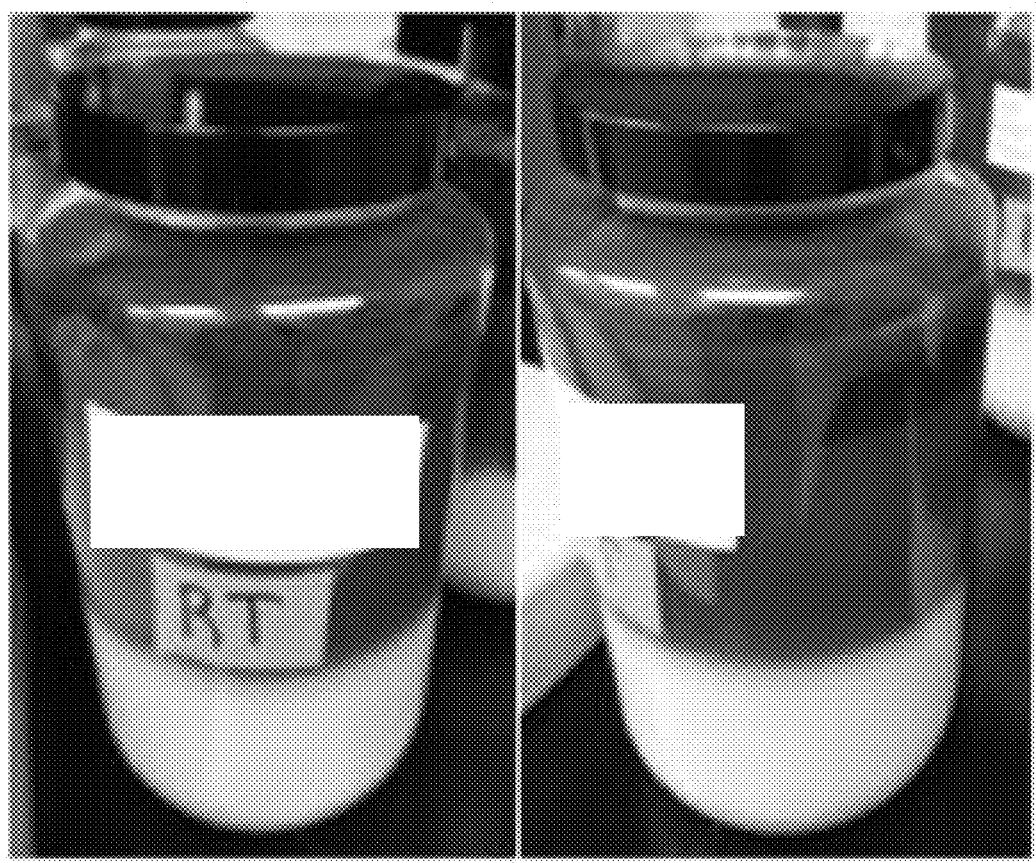
FIG. 8 presents two photographs of a Fungicide+Insecticide test formulation prepared using a conventional order of addition and taken 120 days after storage under ambient conditions, as described in Example 2. The formulation was not mixed prior to the photograph.
Figure 9:
FIG. 9 presents two photographs of a Fungicide+Insecticide test formulation prepared using a conventional order of addition and taken 120 days after storage under accelerated aging conditions, as described in Example 2. The formulation was not mixed prior to the photograph.
Figure 10:
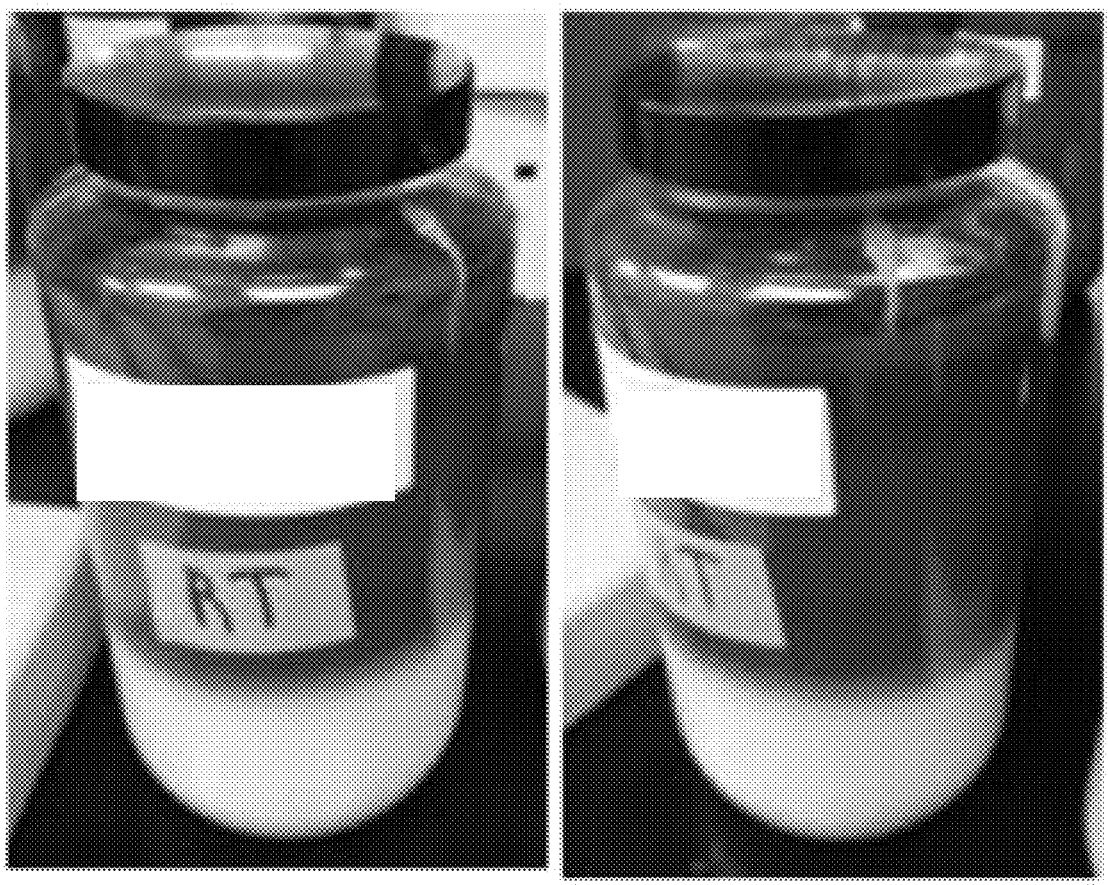
FIG. 10 presents two photographs of a Fungicide+Insecticide test formulation prepared using a density-based order of addition and taken 120 days after storage under ambient conditions, as described in Example 2. The formulation was not mixed prior to the photograph.
Figure 11:
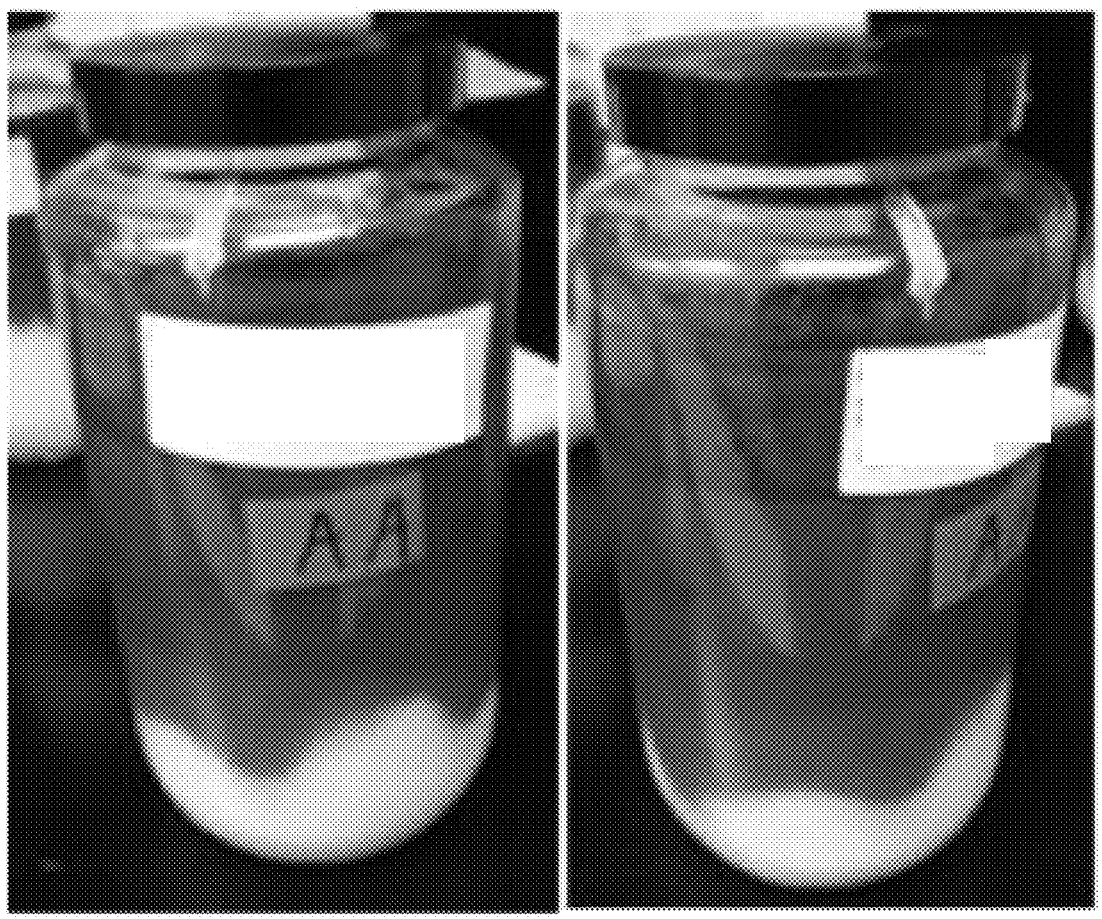
FIG. 11 presents two photographs of a Fungicide+Insecticide test formulation prepared using a density-based order of addition and taken 120 days after storage under accelerated aging conditions, as described in Example 2. The formulation was not mixed prior to the photograph.
Figure 12:
FIG. 12 presents two photographs of a Fungicide test formulation prepared using a conventional order of addition and taken 60 days after storage under ambient conditions, as described in Example 2. The formulation was not mixed prior to the photograph.
Figure 13:
FIG. 13 presents two photographs of a Fungicide test formulation prepared using a conventional order of addition and taken 60 days after storage under accelerated aging conditions, as described in Example 2. The formulation was not mixed prior to the photograph.
Figure 14:
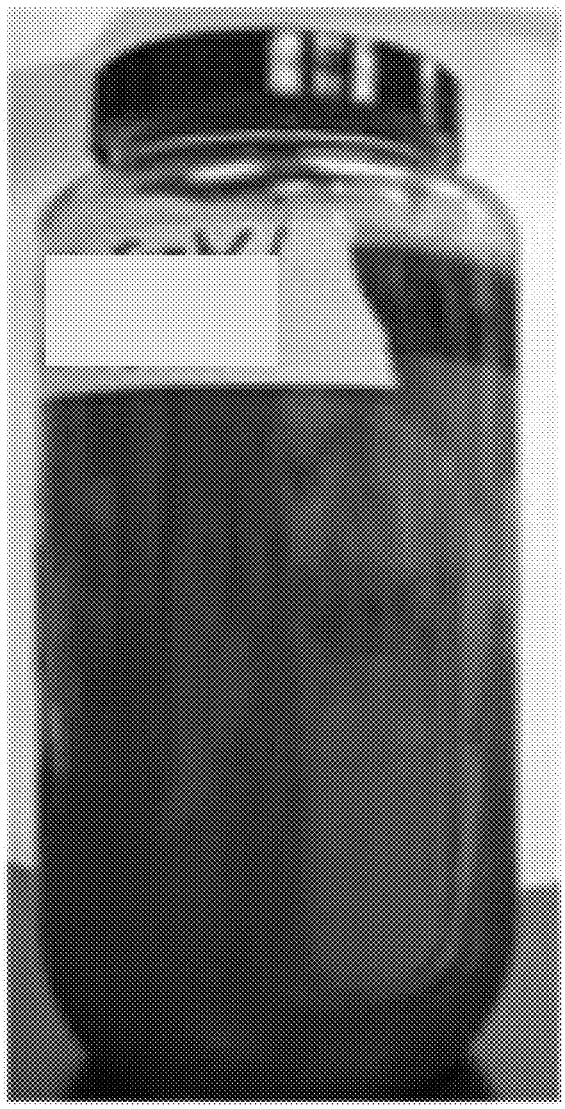
FIG. 14 presents two photographs of a Fungicide test formulation prepared using a density-based order of addition and taken 60 days after storage under ambient conditions, as described in Example 2. The formulation was not mixed prior to the photograph.
Figure 14:
Figure 15:
FIG. 15 presents two photographs of a Fungicide test formulation prepared using a density-based order of addition and taken 60 days after storage under accelerated aging conditions, as described in Example 2. The formulation was not mixed prior to the photograph.

Provided herein are containerized liquid formulations comprising a plurality of agrochemicals. As described in detail below, the formulations comprise a plurality of parallel liquid layers.

Liquid Formulations

Provided herein is a containerized liquid formulation comprising a plurality of agrochemicals. The formulation comprises a plurality of parallel liquid layers. The parallel liquid layers are disposed within the container such that each layer is in contact with at least one adjacent layer at an interface. Typically, the interface between each layer is substantially horizontal.

Each of the separate liquid layers may comprise one or more agrochemicals. Typically, a plurality (i.e., two or more) of the layers comprise an agrochemical. For example, in one embodiment, the formulation comprises at least a first layer comprising a first agrochemical, and a second layer comprising a second agrochemical.

It has been discovered that, in some embodiments, the layering system significantly reduces the interactions between the components present in the various layers, and accordingly provides an improvement in storage stability relative to an otherwise identical formulation where the components are present in a homogeneous mixture. The formulations described herein are therefore particularly useful for the combination of components that are known to interact with one another and cause issues with storage stability.

It is an additional advantageous property of the formulations described herein that each layer may be derived, for example, from a commercially available agrochemical composition. For example, any given layer in the formulation may be in the form of an emulsion concentrate, microemulsion concentrate, suspension concentrate, or solution concentrate comprising one or more agrochemicals.

For example, in some embodiments, at least one of the liquid layers is in the form of a suspension concentrate comprising a dispersed solid phase comprising the agrochemical. In some embodiments, two or more of the liquid layers are in the form of a suspension concentrate comprising a dispersed solid phase comprising an agrochemical.

Without being bound to a particular theory, it is believed that the presence of one or more suspension concentrate layers contributes positively to the stability of the formulation and maintenance of a layered containerized liquid formulation. In most cases, suspension concentrate compositions include dispersants and/or stabilizers to keep the dispersed solid phase in suspension. Without being bound to a particular theory, it is believed that when the suspension concentrate is incorporated into the layered formulation described herein, the dispersants and/or stabilizers act to prevent dispersion of the suspension concentrate layer and inhibit mixing with the adjacent layers. This mechanism allows for stable layered formulations to be prepared even under circumstances that would otherwise be challenging (e.g., when the densities of adjacent layers are similar) Through routine experimentation, those skilled in the art can select suspension concentrate and other liquid compositions and their components as well as those of adjacent layers so as to provide a stable containerized liquid formulation with minimal mixing between adjacent layers over long periods of storage and shipping.

Accordingly, in some embodiments, the formulation comprises at least one layer in the form of a suspension concentrate wherein the dispersed solid phase comprises an agrochemical. For example, in some embodiments, the formulation comprises at least two, at least three, or at least four or more layers in the form of a suspension concentrate wherein the dispersed solid phase comprises an agrochemical. In some embodiments, a plurality, substantially all, or all of the layers that comprise an agrochemical are in the form of a suspension concentrate wherein the dispersed solid phase comprises the agrochemical.

In some embodiments, the parallel layers of the formulation are arranged vertically within the container in order of increasing density, such that the layer having the highest density is at the bottom of the container.

The containerized liquid formulation may comprise one or more liquid layers that do not comprise an agrochemical and that are likewise parallel with the agrochemical-containing layers and contact adjacent layers at a substantially horizontal interface. These layers can comprise, for example, surfactants, colorants, formulation aids, and/or any other useful excipients. For example, in one embodiment, the formulation comprises a layer consisting essentially of a colorant.

Methods of Preparation

Also provided herein are methods of preparing the containerized liquid formulations. Generally, the layered formulation is prepared by adding a sequence of liquid compositions to the container. Each liquid composition is added in a way that forms a new, separate liquid layer that is parallel to, and in contact with, the previously existing liquid layer(s).

For example, in one embodiment, the method comprises adding a first liquid composition to a container comprising a first agrochemical, thereby forming a first liquid layer; and subsequently adding a second liquid composition to the container comprising a second agrochemical, thereby forming a second liquid layer separate from and parallel to the first liquid layer.

Typically, the first liquid layer and the second liquid layer will be in contact with one another at an interface that is substantially horizontal. For example, the methods provided herein can be used to prepare a containerized liquid formulation comprising a plurality of separate and parallel liquid layers, wherein each layer is in contact with at least one adjacent layer at a substantially horizontal interface.

It is desirable to add each liquid composition to the container in a manner that minimizes any disruption to the existing layer(s) below it. Accordingly, in some embodiments, the liquid composition can be added to the container by allowing it to flow downwards in contact with the container wall. It is also desirable that the liquid composition is added at a rate low enough to maintain a laminar flow regime.

In some embodiments, the liquid compositions are added to the container using a delivery tube having an opening oriented toward the container wall. For example, the opening can be oriented such that at least a portion and typically all of the liquid composition exiting the opening of the delivery tube impinges on the container wall above the level of any existing layer(s) and flows downwards into the container in contact with the container wall.

In some embodiments, the liquid compositions are added to the container in order of decreasing density. For example, in these embodiments the liquid composition having the highest density is added first, forming the first layer; the liquid composition having the second-highest density is added second, forming the second layer; and so on.

Alternatively, in some embodiments, the liquid compositions are added to the container in order of decreasing volume. For example, in these embodiments the liquid composition that represents the greatest proportion of the formulation by volume is added first, forming the first layer; the liquid composition that represents the second-greatest proportion of the formulation by volume is added second, forming the second layer; and so on.

Storage Containers

Also provided herein is a storage container comprising a liquid formulation as described herein.

In other embodiments, the liquid formulation is fully enclosed by the container.

In other embodiments, the storage container is a single-use container such as a jug, flask, or drum. For example, the storage container can be a cylindrical drum. The cylindrical drum can be, for example, a drum having a capacity of about 50 to about 200 liters.

In some embodiments, the storage container comprises an integrated mixing apparatus. For example, the integrated mixing apparatus can comprise an impeller mounted on a rotatable shaft. In a preferred embodiment, the integrated mixing apparatus of the storage container is adapted to allow the impeller to be rotated on the shaft within the container without opening the container.

Storage and Shipping Systems

As discussed above, the containerized liquid formulations described herein may, in some embodiments, provide one or more advantages in the context of storage and shipping. Accordingly, provided herein are storage and shipping systems that utilize the formulations described herein.

For example, provided herein is a method of storing and shipping a liquid agrochemical formulation comprising a plurality of agrochemicals, the method comprising: filling a storage container with a liquid formulation as described herein; loading the storage container into an enclosed volume in or on a road or rail vehicle or water-borne vessel in a loading location; and causing the vehicle or vessel after loading into an enclosed volume to move from the loading location to an unloading location.

In some embodiments, the storage container is substantially filled with the liquid formulation. For example, the storage container may be filled to at least 50%, at least 60%, at least 70%, at least 80%, at least 90%, or at least 95% of its design capacity.

In some embodiments, the enclosed volume is, for example, that of a modular box container adapted for road, rail and water transportation, a truck or a railroad boxcar.

Agrochemicals

The liquid formulations described herein comprise a plurality of agrochemicals. Non-limiting examples of agrochemicals that may be present in the liquid formulations are described in detail below.

The formulations in some embodiments may further comprise one or more pesticidal agents. Pesticidal agents include chemical pesticides and biopesticides or biocontrol agents. Various types of chemical pesticides and biopesticides include acaricides, insecticides, nematicides, fungicides, gastropodicides, herbicides, virucides, bactericides, and combinations thereof. Biopesticides or biocontrol agents may include bacteria, fungi, beneficial nematodes, and viruses that exhibit pesticidal activity. Compositions may comprise other agents for pest control, such as microbial extracts and/or plant defense agents.

Acaricides, Insecticides and/or Nematicides

In some embodiments, the formulation comprises one or more chemical acaricides, insecticides, and/or nematicides. Non-limiting examples of chemical acaricides, insecticides, and/or nematicides may include one or more carbamates, diamides, macrocyclic lactones, neonicotinoids, organophosphates, phenylpyrazoles, pyrethrins, spinosyns, synthetic pyrethroids, tetronic acids and/or tetramic acids. Non-limiting examples of chemical acaricides, insecticides and nematicides that can be useful in formulations of the present disclosure include abamectin, acrinathrin, aldicarb, aldoxycarb, alpha-cypermethrin, betacyfluthrin, bifenthrin, cyhalothrin, cypermethrin, deltamethrin, esfenvalerate, etofenprox, fenpropathrin, fenvalerate, flucythrinate, fosthiazate, lambda-cyhalothrin, gamma-cyhalothrin, permethrin, tau-fluvalinate, transfluthrin, zeta-cypermethrin, cyfluthrin, bifenthrin, tefluthrin, eflusilanat, fubfenprox, pyrethrin, resmethrin, imidacloprid, acetamiprid, thiamethoxam, nitenpyram, thiacloprid, dinotefuran, clothianidin, chlorfluazuron, diflubenzuron, lufenuron, teflubenzuron, triflumuron, novaluron, flufenoxuron, hexaflumuron, bistrifluoron, noviflumuron, buprofezin, cyromazine, methoxyfenozide, tebufenozide, halofenozide, chromafenozide, endosulfan, fipronil, ethiprole, pyrafluprole, pyriprole, flubendiamide, chlorantraniliprole (e.g., Rynaxypyr), cyazypyr, emamectin, emamectin benzoate, abamectin, ivermectin, milbemectin, lepimectin, tebufenpyrad, fenpyroximate, pyridaben, fenazaquin, pyrimidifen, tolfenpyrad, dicofol, cyenopyrafen, cyflumetofen, acequinocyl, fluacrypyrin, bifenazate, diafenthiuron, etoxazole, clofentezine, spinosad, triarathen, tetradifon, propargite, hexythiazox, bromopropylate, chinomethionat, amitraz, pyrifluquinazon, pymetrozine, flonicamid, pyriproxyfen, diofenolan, chlorfenapyr, metaflumizone, indoxacarb, chlorpyrifos, spirodiclofen, spiromesifen, spirotetramat, pyridalyl, spinctoram, acephate, triazophos, profenofos, oxamyl, spinetoram, fenamiphos, fenamipclothiahos, 4-{[(6-chloropyrid-3-yl)methyl](2,2-difluoroethyl) amino}furan-2(5H)-one, 3,5-disubstituted-1,2,4-oxadiazole compounds, 3-phenyl-5-(thien-2-yl)-1,2,4-oxadiazole, cadusaphos, carbaryl, carbofuran, ethoprophos, thiodicarb, aldicarb, aldoxycarb, metamidophos, methiocarb, sulfoxaflor, methamidophos, cyantraniliprole and tioxazafen and combinations thereof. Additional non-limiting examples of chemical acaricides, insecticides, and/or nematicides may include one or more of abamectin, aldicarb, aldoxycarb, bifenthrin, carbofuran, chlorantraniliporle, chlothianidin, cyfluthrin, cyhalothrin, cypermethrin, cyantraniliprole, dinotefuran, emamectin, ethiprole, fenamiphos, fipronil, flubendiamide, fosthiazate, imidacloprid, ivermectin, lambda-cyhalothrin, milbemectin, nitenpyram, oxamyl, permethrin, spinetoram, spinosad, spirodichlofen, spirotetramat, tefluthrin, thiacloprid, thiamethoxam, tioxazafen and/or thiodicarb, and combinations thereof.

Additional non-limiting examples of acaricides, insecticides and nematicides that may be included or used in formulations in some embodiments may be found in Steffey and Gray, *Managing Insect Pests*, ILLINOIS AGRONOMY HANDBOOK (2008); and Niblack, *Nematodes*, ILLINOIS AGRONOMY HANDBOOK (2008), the contents and disclosures of which are incorporated herein by reference. Non-limiting examples of commercial insecticides which may be suitable for the formulations disclosed herein include CRUISER (Syngenta, Wilmington, Del.), GAUCHO and PONCHO (Gustafson, Plano, Tex.). Active ingredients in these and other commercial insecticides may include thiamethoxam, clothianidin, and imidacloprid. Commercial acaricides, insecticides, and/or nematicides may be used in accordance with a manufacturer's recommended amounts or concentrations.

In some embodiments, the formulation comprises one or more biopesticidal agents the presence and/or output of which is toxic to an acarid, insect and/or nematode. For example, the formulation may comprise one or more of *Bacillus firmus* 1-1582, *Bacillus mycoides* AQ726, NRRL B-21664; *Beauveria bassiana* ATCC-74040, *Beauveria bassiana* ATCC-74250, *Burkholderia* sp. A396 sp. nov. rinojensis, NRRL B-50319, *Chromobacterium subtsugae* NRRL B-30655, *Chromobacterium vaccinii* NRRL B-50880, *Flavobacterium* H492, NRRL B-50584, *Metarhizium anisopliae* F52 (also known as *Metarhizium anisopliae* strain 52, *Metarhizium anisopliae* strain 7, *Metarhizium anisopliae* strain 43, and/or *Metarhizium anisopliae* BIO-1020, TAE-001; deposited as DSM 3884, DSM 3885, ATCC 90448, SD 170 and ARSEF 7711), *Paecilomyces fumosoroseus* FE991, and combinations thereof.

Fungicides

In some embodiments, the formulation comprises one or more chemical fungicides. Non-limiting examples of chemical fungicides may include one or more aromatic hydrocarbons, benzthiadiazole, carboxylic acid amides, morpholines, phenylamides, phosphonates, thiazolidines, thiophene, quinone outside inhibitors and strobilurins, such as azoxystrobin, coumethoxystrobin, coumoxystrobin, dimoxystrobin, enestroburin, fluoxastrobin, kresoxim-methyl, metominostrobin, orysastrobin, picoxystrobin, pyraclostrobin, pyrametostrobin, pyraoxystrobin, pyribencarb, trifloxystrobin, 2-[2-(2,5-dimethyl-phenoxymethyl)-phenyl]-3-methoxy-acrylic acid methyl ester, and 2-(2-(3-(2,6-dichlorophenyl)-1-methyl-allylideneaminooxymethyl)-phenyl)-2-methoxyimino-N-methyl-acetamide, carboxamides, such as carboxanilides (e.g., benalaxyl, benalaxyl-M, benodanil, bixafen, boscalid, carboxin, fenfuram, fenhexamid, flutolanil, fluxapyroxad, furametpyr, isopyrazam, isotianil, kiralaxyl, mepronil, metalaxyl, metalaxyl-M (mefenoxam), ofurace, oxadixyl, oxycarboxin, penflufen, penthiopyrad, sedaxane, tecloftalam, thifluzamide, tiadinil, 2-amino-4-methyl-thiazole-5-carboxanilide, N-(4'-trifluoromethylthiobiphenyl-2-yl)-3-difluoromethyl-1-methyl-1H-pyra-zole-4-carboxamide, N-(2-(1,3,3-trimethylbutyl)-phenyl)-1,3-dimethyl-5-fluoro-1H-pyrazole-4-carboxamide), carboxylic morpholides (e.g., dimethomorph, flumorph, pyrimorph), benzoic acid amides (e.g., flumetover, fluopicolide, fluopyram, zoxamide), carpropamid, dicyclomet, mandiproamid, fenehexamid, oxytetracyclin, silthiofam, and N-(6-methoxy-pyridin-3-yl) cyclopropanecarboxylic acid amide, spiroxamine, azoles, such as triazoles (e.g., azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole) and imidazoles (e.g., cyazofamid, imazalil, pefurazoate, prochloraz, triflumizol); heterocyclic compounds, such as pyridines (e.g., fluazinam, pyrifenox (cf.D1b), 3-[5-(4-chloro-phenyl)-2,3-dimethyl-isoxazolidin-3-yl]-pyridine, 3-[5-(4-methyl-phenyl)-2,3-dimethyl-isoxazolidin-3-yl]-pyridine), pyrimidines (e.g., bupirimate, cyprodinil, diflumetorim, fenarimol, ferimzone, mepanipyrim, nitrapyrin, nuarimol, pyrimethanil), piperazines (e.g., triforine), pyrroles (e.g., fenpiclonil, fludioxonil), morpholines (e.g., aldimorph, dodemorph, dodemorph-acetate, fenpropimorph, tridemorph), piperidines (e.g., fenpropidin); dicarboximides (e.g., fluoroimid, iprodione, procymidone, vinclozolin), non-aromatic 5-membered heterocycles (e.g., famoxadone, fenamidone, flutianil, octhilinone, probenazole, 5-amino-2-isopropyl-3-oxo-4-ortho-tolyl-2,3-dihydro-pyrazole-1-carbothioic acid S-allyl ester), acibenzolar-S-methyl, ametoctradin, amisulbrom, anilazin, blasticidin-S, captafol, captan, chinomethionat, dazomet, debacarb, diclomezine, difenzoquat, difenzoquat-methylsulfate, fenoxanil, folpet, oxolinic acid, piperalin, proquinazid, pyroquilon, quinoxyfen, triazoxide, tricyclazole, 2-butoxy-6-iodo-3-propylchromen-4-one, 5-chloro-1-(4,6-dimethoxy-pyrimidin-2-yl)-2-methyl-1H-benzoimidazole and 5-chloro-7-(4-methylpiperidin-1- yl)-6-(2,4,6-trifluorophenyl)-[1,2,4]triazolo-[1,5-a] pyrimidine; benzimidazoles, such as carbendazim; and other active substances, such as guanidines (e.g., guanidine, dodine, dodine free base, guazatine, guazatine-acetate, iminoctadine), iminoctadine-triacetate and iminoctadine-tris(albesilate); antibiotics (e.g., kasugamycin, kasugamycin hydrochloride-hydrate, streptomycin, polyoxine and validamycin A), nitrophenyl derivates (e.g., binapacryl, dicloran, dinobuton, dinocap, nitrothal-isopropyl, tecnazen), organometal compounds (e.g., fentin salts, such as fentinacetate, fentin chloride, fentin hydroxide); sulfur-containing heterocyclyl compounds (e.g., dithianon, isoprothiolane), organophosphorus compounds (e.g., edifenphos, fosetyl, iprobenfos, phosphorus acid and its salts, pyrazophos, tolclofos-methyl), organochlorine compounds (e.g., chlorothalonil, dichlofluanid, dichlorophen, flusulfamide, hexachlorobenzene, pencycuron, pentachlorphenole and its salts, phthalide, quintozene, thiophanate-methyl, thiophanates, tolylfluanid, N-(4-chloro-2-nitro-phenyl)-N-ethyl-4-methylbenzenesulfonamide) and inorganic active substances (e.g., Bordeaux mixture, copper acetate, copper hydroxide, copper oxychloride, basic copper sulfate, sulfur) and combinations thereof. In an aspect, the formulations in some embodiments comprise acibenzolar-S-methyl, azoxystrobin, benalaxyl, bixafen, boscalid, carbendazim, cyproconazole, dimethomorph, epoxiconazole, fludioxonil, fluopyram, fluoxastrobin, flutianil, flutolanil, fluxapyroxad, fosetyl-Al, ipconazole, isopyrazam, kresoxim-methyl, mefenoxam, metalaxyl, metconazole, myclobutanil, orysastrobin, penflufen, penthiopyrad, picoxystrobin, propiconazole, prothioconazole, pyraclostrobin, sedaxane, silthiofam, tebuconazole, thiabendazole, thifluzamide, thiophanate, tolclofos-methyl, trifloxystrobin and triticonazole, and combinations thereof.

For additional examples of fungicides that may be included in the formulations in some embodiments see, e.g., Bradley, *Managing Diseases*, ILLINOIS AGRONOMY HANDBOOK (2008), the content and disclosure of which are incorporated herein by reference. Fungicides useful for the formulations in some embodiments may exhibit activity against one or more fungal plant pathogens, including but not limited to *Phytophthora, Rhizoctonia, Fusarium, Pythium, Phomopsis*, Selerotinia or *Phakopsora*, and combinations thereof. Non-limiting examples of commercial fungicides which may be suitable for the formulations in some embodiments include PROTÉGÉ, RIVAL or ALLEGIANCE FL or LS (Gustafson, Plano, Tex.), WARDEN RTA (Agrilance, St. Paul, Minn.), APRON XL, APRON MAXX RTA or RFC, MAXIM 4FS or XL (Syngenta, Wilmington, Del.), CAPTAN (Arvesta, Guelph, Ontario) and PROTREAT (Nitragin Argentina, Buenos Ares, Argentina). Active ingredients in these and other commercial fungicides include, but are not limited to, fludioxonil, mefenoxam, azoxystrobin and metalaxyl. Commercial fungicides may be used in accordance with a manufacturer's recommended amounts or concentrations.

In some embodiments, the formulation comprises one or more biopesticidal agents the presence and/or output of which is toxic to at least one fungus and/or bacteria. For example, the formulation may comprise one or more of *Ampelomyces quisqualis* AQ 10® (Intrachem Bio GmbH & Co. KG, Germany), *Aspergillus flavus* AFLA-GUARD® (Syngenta Crop Protection, Inc., CH), *Aureobasidium pullulans* BOTECTOR® (bio-ferm GmbH, Germany), *Bacillus pumilus* AQ717 (NRRL B-21662), *Bacillus pumilus* NRRL B-30087, *Bacillus* AQ175 (ATCC 55608), *Bacillus* AQ177 (ATCC 55609), *Bacillus subtilis* AQ713 (NRRL B-21661), *Bacillus subtilis* AQ743 (NRRL B-21665), *Bacillus amyloliquefaciens* FZB24, *Bacillus amyloliquefaciens* FZB42, *Bacillus amyloliquefaciens* NRRL B-50349, *Bacillus subtilis* ATCC 55078, *Bacillus subtilis* ATCC 55079, *Bacillus thuringiensis* AQ52 (NRRL B-21619), *Candida oleophila* 1-182 (e.g., ASPIRE® from Ecogen Inc., USA), *Candida saitoana* BIOCURE® (in mixture with lysozyme; BASF, USA) and BIOCOAT® (ArystaLife Science, Ltd., Cary, N.C.), *Clonostachys rosea* f. *catenulata* (also referred to as *Gliocladium catenulatum*) J1446 (PRESTOP®, Verdera, Finland), *Coniothyrium minitans* CONTANS® (Prophyta, Germany), *Cryphonectria parasitica* (CNICM, France), *Cryptococcus albidus* YIELD PLUS® (Anchor Bio-Technologies, South Africa), *Fusarium oxysporum* BIOFOX® (from S.I.A.P.A., Italy) and FUSACLEAN® (Natural Plant Protection, France), *Metschnikowia fructicola* SHEMER® (Agrogreen, Israel), *Microdochium dimerum* ANTIBOT® (Agrauxine, France), *Muscodor albus* NRRL 30547, *Muscodor roseus* NRRL 30548, *Phlebiopsis gigantea* ROTSOP® (Verdera, Finland), *Pseudozyma flocculosa* SPORODEX® (Plant Products Co. Ltd., Canada), *Pythium oligandrum* DV74 (POLYVERSUM®, Remeslo SSRO, Biopreparaty, Czech Rep.), *Reynoutria sachlinensis* (e.g., REGALIA® from Marrone Biolnnovations, USA), *Streptomyces* NRRL B-30145, *Streptomyces* M1064, *Streptomyces galbus* NRRL 30232, *Streptomyces lydicus* WYEC 108 (ATCC 55445), *Streptomyces violaceusniger* YCED 9 (ATCC 55660; DE-THATCH-9®, DECOMP-9® and THATCH CONTROL®, Idaho Research Foundation, USA), *Streptomyces* WYE 53 (ATCC 55750; DE-THATCH-9®, DECOMP-9® and THATCH CONTROL®, Idaho Research Foundation, USA), *Talaromyces flavus* V117b (PROTUS®, Prophyta, Germany), *Trichoderma asperellum* SKT-1 (ECO-HOPE®, Kumiai Chemical Industry Co., Ltd., Japan), *Trichoderma atroviride* LC52 (SENTINEL®, Agrimm Technologies Ltd, NZ), *Trichoderma harzianum* T-22 (PLANTSHIELD®, der Firma BioWorks Inc., USA), *Trichoderma harzianum* TH-35 (ROOT PRO®, from Mycontrol Ltd., Israel), *Trichoderma harzianum* T-39 (TRICHODEX®, Mycontrol Ltd., Israel; TRICHODERMA 2000®, Makhteshim Ltd., Israel), *Trichoderma harzianum* ICC012 and *Trichoderma viride* TRICHOPEL (Agrimm Technologies Ltd, NZ), *Trichoderma harzianum* ICC012 and *Trichoderma viride* ICC080 (REMEDIER® WP, Isagro Ricerca, Italy), *Trichoderma polysporum* and *Trichoderma harzianum* (BINAB®, BINAB Bio-Innovation AB, Sweden), *Trichoderma stromaticum* TRICOVAB® (C.E.P.L.A.C., Brazil), *Trichoderma virens* GL-21 (SOILGARD®, Certis LLC, USA), and combinations thereof.

Herbicides

In some embodiments, the formulation comprises one or more suitable chemical herbicides. The herbicides may be a pre-emergent herbicide, a post-emergent herbicide, or a combination thereof. Non-limiting examples of chemical herbicides may comprise one or more acetyl CoA carboxylase (ACCase) inhibitors, acetolactate synthase (ALS) inhibitors, acetanilides, acetohydroxy acid synthase (AHAS) inhibitors, photosystem II inhibitors, photosystem I inhibitors, protoporphyrinogen oxidase (PPO or Protox) inhibitors, carotenoid biosynthesis inhibitors, enolpyruvylshikimate-3-phosphate (EPSP) synthase inhibitors, glutamine synthetase inhibitors, dihydropteroate synthetase inhibitors, mitosis inhibitors, 4-hydroxyphenyl-pyruvate-dioxygenase (4-HPPD) inhibitors, synthetic auxins, auxin herbicide salts, auxin transport inhibitors, nucleic acid inhibitors and/or one or more salts, esters, racemic mixtures and/or resolved isomers thereof. Non-limiting examples of chemical herbicides that can be useful in formulations of the present disclosure include 2,4-dichlorophenoxyacetic acid (2,4-D), 2,4,5-trichlorophenoxyacetic acid (2,4,5-T), ametryn, amicarbazone, aminocyclopyrachlor, acetochlor, acifluorfen, alachlor, atrazine, azafenidin, bentazon, benzofenap, bifenox, bromacil, bromoxynil, butachlor, butafenacil, butroxydim, carfentrazone-ethyl, chlorimuron, chlorotoluro, clethodim, clodinafop, clomazone, cyanazine, cycloxydim, cyhalofop, desmedipham, desmetryn, dicamba, diclofop, dimefuron, diflufenican, diuron, dithiopyr, ethofumesate, fenoxaprop, foramsulfuron, fluazifop, fluazifop-P, flufenacet, fluometuron, flufenpyr-ethyl, flumiclorac, flumicloracpentyl, flumioxazin, fluoroglycofen, fluthiacet-methyl, fomesafen, glyphosate, glufosinate, halosulfuron, haloxyfop, hexazinone, iodosulfuron, indaziflam, imazamox, imazaquin, imazethapyr, ioxynil, isoproturon, isoxaflutole, lactofen, linuron, mecoprop, mecoprop-P, mesosulfuron, mesotrion, metamitron, metazochlor, methibenzuron, metolachlor (and S-metolachlor), metoxuron, metribuzin, monolinuron, oxadiargyl, oxadiazon, oxaziclomefone, oxyfluorfen, phenmedipham, pretilachlor, profoxydim, prometon, prometrn, propachlor, propanil, propaquizafop, propisochlor, propoxycarbazone, pyraflufen-ethyl, pyrazon, pyrazolynate, pyrazoxyfen, pyridate, quizalofop, quizalofop-P (e.g., quizalofop-ethyl, quizalofop-P-ethyl, clodinafop-propargyl, cyhalofop-butyl, diclofop-methyl, fenoxaprop-P-ethyl, fluazifop-P-butyl, haloxyfop-methyl, haloxyfop-R-methyl), saflufenacil, sethoxydim, siduron, simazine, simetryn, sulcotrione, sulfentrazone, tebuthiuron, tembotrione, tepraloxydim, terbacil, terbumeton, terbuthylazine, thaxtomin (e.g., the thaxtomins described in U.S. Pat. No. 7,989,393), thiencarbazone-methyl, thenylchlor, tralkoxydim, triclopyr, trietazine, trifloxysulfuron, tropramezone, salts and esters thereof; racemic mixtures and resolved isomers thereof and combinations thereof. In an embodiment, formulations comprise acetochlor, clethodim, dicamba, flumioxazin, fomesafen, glyphosate, glufosinate, mesotrione, quizalofop, saflufenacil, sulcotrione, S-3100 and/or 2,4-D, and combinations thereof.

Additional examples of herbicides that may be included in formulations in some embodiments may be found in Hager, *Weed Management*, Illinois Agronomy Handbook (2008); and Loux et al., Weed Control Guide for Ohio, Indiana and Illinois (2015), the contents and disclosures of which are incorporated herein by reference. Commercial herbicides may be used in accordance with a manufacturer's recommended amounts or concentrations.

In some embodiments, the formulation comprises one or more biopesticidal agents the presence and/or output of which is toxic to at least one plant, including for example, weeds. Examples of biopesticides that may be included or used in formulations in some embodiments may be found in BURGES, supra; HALL & MENN, BIOPESTICIDES: USE AND DELIVERY (Humana Press) (1998); McCoy et al., *Entomogenous fungi*, in CRC HANDBOOK OF NATURAL PESTICIDES. MICROBIAL PESTICIDES, PART A. ENTOMOGENOUS PROTOZOA AND FUNGI (C. M. Inoffo, ed.), Vol. 5:151-236 (1988); SAMSON et al., ATLAS OF ENTOMOPATHOGENIC FUNGI (Springer-Verlag, Berlin) (1988); and deFaria and Wraight, *Mycoinsecticides and Mycoacaricides: A comprehensive list with worldwide coverage and international classification of formulation types*, BIOL. CONTROL (2007), the contents and disclosures of which are incorporated herein by reference.

Additional Agents

In some embodiments, the formulation comprises one or more additional agent.

In some embodiments, the formulation comprises one or more beneficial biologically active agents such as biostimulants and/or microbial inoculants. Biostimulants or inoculants may enhance ion uptake, nutrient uptake, nutrient availability or delivery, or a combination thereof. Non-limiting examples of biostimulants or inoculants that may be included or used in formulations may include bacterial extracts (e.g., extracts of one or more diazotrophs, phosphate-solubilizing microorganisms and/or biopesticides), fungal extracts, humic acids (e.g., potassium humate), fulvic acids, myo-inositol, and/or glycine, and any combinations thereof. According to some embodiments, the biostimulants or inoculants may comprise one or more *Azospirillum* (e.g., an extract of media comprising *A. brasilense* INTA Az-39), one or more *Bradyrhizobium* (e.g., an extract of media comprising *B. elkanii* SEMIA 501, *B. elkanii* SEMIA 587, *B. elkanii* SEMIA 5019, *B. japonicum* NRRL B-50586 (also deposited as NRRL B-59565), *B. japonicum* NRRL B-50587 (also deposited as NRRL B-59566), *Bacillus amyloliquefaciens* TJ1000 (also known as 1BE, isolate ATCC BAA-390), *B. japonicum* NRRL B-50588 (also deposited as NRRL B-59567), *B. japonicum* NRRL B-50589 (also deposited as NRRL B-59568), *B. japonicum* NRRL B-50590 (also deposited as NRRL B-59569), *B. japonicum* NRRL B-50591 (also deposited as NRRL B-59570), *Trichoderma virens* G1-3 (ATCC 57678), *Trichoderma virens* G1-21 (Thermo Trilogy Corporation, Wasco, Calif.), *Trichoderma virens* G1-3 and *Bacillus amyloliquefaciens* FZB24, *Trichoderma virens* G1-3 and *Bacillus amyloliquefaciens* NRRL B-50349, *Trichoderma virens* G1-3 and *Bacillus amyloliquefaciens* TJ1000, *Trichoderma virens* G1-21 and *Bacillus amyloliquefaciens* FZB24, *Trichoderma virens* G1-21 and *Bacillus amyloliquefaciens* NRRL B-50349, *Trichoderma virens* G1-21 and *Bacillus amyloliquefaciens* TJ1000, *Trichoderma viride* TRIECO® (Ecosense Labs. (India) Pvt. Ltd., India, BIO-CURE® F from T. Stanes & Co. Ltd., Indien), *Trichoderma viride* TV1 (Agribiotec srl, Italy), *Trichoderma viride* ICC080, and/or *Ulocladium oudemansii* HRU3 (BOTRY-ZEN®, Botry-Zen Ltd, NZ), *B. japonicum* NRRL B-50592 (also deposited as NRRL B-59571), *B. japonicum* NRRL B-50593 (also deposited as NRRL B-59572), *B. japonicum* NRRL B-50594 (also deposited as NRRL B-50493), *B. japonicum* NRRL B-50608, *B. japonicum* NRRL B-50609, *B. japonicum* NRRL B-50610, *B. japonicum* NRRL B-50611, *B. japonicum* NRRL B-50612, *B. japonicum* NRRL B-50726, *B. japonicum* NRRL B-50727, *B. japonicum* NRRL B-50728, *B. japonicum* NRRL B-50729, *B. japonicum* NRRL B-50730, *B. japonicum* SEMIA 566, *B. japonicum* SEMIA 5079, *B. japonicum* SEMIA 5080, *B. japonicum* USDA 6, *B. japonicum* USDA 110, *B. japonicum* USDA 122, *B. japonicum* USDA 123, *B. japonicum* USDA 127, *B. japonicum* USDA 129 and/or *B. japonicum* USDA 532C), one or more *Rhizobium* extracts (e.g., an extract of media comprising *R. leguminosarum* S012A-2), one or more *Sinorhizobium* extracts (e.g., an extract of media comprising *S. fredii* CCBAU114 and/or *S. fredii* USDA 205), one or more *Penicillium* extracts (e.g., an extract of media comprising *P. bilaiae* ATCC 18309, *P. bilaiae* ATCC 20851, *P. bilaiae* ATCC 22348, *P. bilaiae* NRRL 50162, *P. bilaiae* NRRL 50169, *P. bilaiae* NRRL 50776, *P. bilaiae* NRRL 50777, *P. bilaiae* NRRL 50778, *P. bilaiae* NRRL 50777, *P. bilaiae* NRRL 50778, *P. bilaiae* NRRL 50779, *P. bilaiae* NRRL 50780, *P. bilaiae* NRRL 50781, *P. bilaiae* NRRL 50782, *P. bilaiae* NRRL 50783, *P. bilaiae* NRRL 50784, *P. bilaiae* NRRL 50785, *P. bilaiae* NRRL 50786, *P. bilaiae* NRRL 50787, *P. bilaiae* NRRL 50788, *P. bilaiae* RS7B-SD1, *P. brevicompactum* AgRF18, *P. canescens* ATCC 10419, *P. expansum* ATCC 24692, *P. expansum* YT02, *P. fellatanum* ATCC 48694, *P. gaestrivorus* NRRL 50170, *P. glabrum* DAOM 239074, *P. glabrum* CBS 229.28, *P. janthinellum* ATCC 10455, *P. lanosocoeruleum* ATCC 48919, *P. radicum* ATCC 201836, *P. radicum* FRR 4717, *P. radicum* FRR 4719, *P. radicum* N93/47267 and/or *P. raistrickii* ATCC 10490), one or more *Pseudomonas* extracts (e.g., an extract of media comprising *P. jessenii* PS06), one or more acaricidal, insecticidal and/or nematicidal extracts (e.g., an extract of media comprising *Bacillus firmus* 1-1582, *Bacillus mycoides* AQ726, NRRL B-21664; *Beauveria bassiana* ATCC-74040, *Beauveria bassiana* ATCC-74250, *Burkholderia* sp. A396 sp. nov. rinojensis, NRRL B-50319, *Chromobacterium subtsugae* NRRL B-30655, *Chromobacterium vaccinii* NRRL B-50880, *Flavobacterium* H492, NRRL B-50584, *Metarhizium anisopliae* F52 (also known as *Metarhizium anisopliae* strain 52, *Metarhizium anisopliae* strain 7, *Metarhizium anisopliae* strain 43 and *Metarhizium anisopliae* BIO-1020, TAE-001; deposited as DSM 3884, DSM 3885, ATCC 90448, SD 170 and ARSEF 7711) and/or *Paecilomyces fumosoroseus* FE991), and/or one or more fungicidal extracts (e.g., an extract of media comprising *Ampelomyces quisqualis* AQ 10® (Intrachem Bio GmbH & Co. KG, Germany), *Aspergillus flavus* AFLA-GUARD® (Syngenta Crop Protection, Inc., CH), *Aureobasidium pullulans* BOTECTOR® (bio-ferm GmbH, Germany), *Bacillus pumilus* AQ717 (NRRL B-21662), *Bacillus pumilus* NRRL B-30087, *Bacillus* AQ175 (ATCC 55608), *Bacillus* AQ177 (ATCC 55609), *Bacillus subtilis* AQ713 (NRRL B-21661), *Bacillus subtilis* AQ743 (NRRL B-21665), *Bacillus amyloliquefaciens* FZB24, *Bacillus amyloliquefaciens* NRRL B-50349, *Bacillus amyloliquefaciens* TJ1000 (also known as 1BE, isolate ATCC BAA-390), *Bacillus thuringiensis* AQ52 (NRRL B-21619), *Candida oleophila* 1-82 (e.g., ASPIRE® from Ecogen Inc., USA), *Candida saitoana* BIO-CURE® (in mixture with lysozyme; BASF, USA) and BIOCOAT® (ArystaLife Science, Ltd., Cary, N.C.), *Clonostachys rosea* f. *catenulata* (also referred to as *Gliocladium catenulatum*) J1446 (PRESTOP®, Verdera, Finland), *Coniothyrium minitans* CONTANS® (Prophyta, Germany), *Cryphonectria parasitica* (CNICM, France), *Cryptococcus albidus* YIELD PLUS® (Anchor Bio-Technologies, South Africa), *Fusarium oxysporum* BIOFOX® (from S.I.A.P.A., Italy) and FUSACLEAN® (Natural Plant Protection, France), *Metschnikowia fructicola* SHEMER® (Agrogreen, Israel), *Microdochium dimerum* ANTIBOT® (Agrauxine, France), *Muscodor albus* NRRL 30547, *Muscodor roseus* NRRL 30548, *Phlebiopsis gigantea* ROTSOP® (Verdera, Finland), *Pseudozyma flocculosa* SPORODEX® (Plant Products Co. Ltd., Canada), *Pythium oligandrum* DV74 (POLYVERSUM®, Remeslo SSRO, Biopreparaty, Czech Rep.), *Reynoutria sachlinensis* (e.g., REGALIA® from Marrone BioInnovations, USA), *Streptomyces* NRRL B-30145, *Streptomyces* M1064, *Streptomyces galbus* NRRL 30232, *Streptomyces lydicus* WYEC 108 (ATCC 55445), *Streptomyces violaceusniger* YCED 9 (ATCC 55660; DE-THATCH-9®, DECOMP-9® and THATCH CONTROL®, Idaho Research Foundation, USA), *Streptomyces* WYE 53 (ATCC 55750; DE-THATCH-9®, DECOMP-9® and THATCH CONTROL®, Idaho Research Foundation, USA), *Talaromyces flavus* V117b (PROTUS®, Prophyta, Germany), *Trichoderma asperellum* SKT-1 (ECO-HOPE®, Kumiai Chemical Industry Co., Ltd., Japan), *Trichoderma atroviride* LC52 (SENTINEL®, Agrimm Technologies Ltd, NZ), *Trichoderma harzianum* T-22 (PLANTSHIELD®, der Firma BioWorks Inc., USA), *Trichoderma harzianum* TH-35 (ROOT PRO®, from Mycontrol Ltd., Israel), *Trichoderma harzianum* T-39 (TRICHODEX®, Mycontrol Ltd., Israel; TRICHODERMA 2000®, Makhteshim Ltd., Israel), *Trichoderma harzianum* ICC012 and *Trichoderma viride* TRICHOPEL (Agrimm Technologies Ltd, NZ), *Trichoderma harzianum* ICC012 and *Trichoderma viride* ICC080 (REMEDIER® WP, Isagro Ricerca, Italy), *Trichoderma polysporum* and *Trichoderma harzianum* (BINAB®, BINAB Bio-Innovation AB, Sweden), *Trichoderma stromaticum* TRICOVAB®) (C.E.P.L.A.C., Brazil), *Trichoderma virens* GL-21 (SOILGARD®, Certis LLC, USA), *Trichoderma virens* G1-3, ATCC 57678, *Trichoderma virens* G1-21 (Thermo Trilogy Corporation, Wasco, Calif.), *Trichoderma virens* G1-3 and *Bacillus amyloliquefaciens* FZB2, *Trichoderma virens* G1-3 and *Bacillus amyloliquefaciens* NRRL B-50349, *Trichoderma virens* G1-3 and *Bacillus amyloliquefaciens* TJ1000, *Trichoderma virens* G1-21 and *Bacillus amyloliquefaciens* FZB24, *Trichoderma virens* G1-21 and *Bacillus amyloliquefaciens* NRRL B-50349, *Trichoderma virens* G1-21 and *Bacillus amyloliquefaciens* TJ1000, *Trichoderma viride* TRIECO® (Ecosense Labs. (India) Pvt. Ltd., Indien, BIO-CURE® F from T. Stanes & Co. Ltd., Indien), *Trichoderma viride* TV1 (Agribiotec srl, Italy), *Trichoderma viride* ICC080, and/or *Ulocladium oudemansii* HRU3 (BOTRY-ZEN®, Botry-Zen Ltd, NZ)), and combinations thereof.

In some embodiments, the formulation comprises one or more beneficial microbes. Non-limiting examples of such microbes include beneficial microbes selected from the following genera: Actinomycetes, *Agrobacterium*, *Arthrobacter*, *Alcaligenes*, *Acinetobacter* spp, *Azospirillum* spp, *Aureobacterium*, *Azobacter*, *Azorhizobium*, *Bacillus*, *Beijerinckia*, *Bradyrhizobium*, *Brevibacillus*, *Burkholderia*, *Chromobacterium*, *Chryseomonas* spp., *Clostridium*, *Clavibacter*, *Comamonas*, *Corynebacterium*, *Curtobacterium*, *Enterobacter*, *Eupenicillium* spp., *Exiguobacterium* spp., *Flavobacterium*, *Gluconobacter*, *Hydrogenophaga*, *Hymenoscyphous*, *Klebsiella*, *Kluyvera* spp., *Methylobacterium*, *Paenibacillus*, *Pasteuria*, *Photorhabdus*, *Phyllobacterium*, *Pseudomonas*, *Rhizobium*, *Rhizobacter*, *Rhizopogon*, *Serratia*, *Sinorhizobium*, *Sphingobacterium*, *Swaminathania* spp., *Stenotrophomonas*, *Streptomyces* spp., *Thiobacillus*, *Variovorax*, *Vibrio*, *Xanthobacter*, *Xanthomonas* and *Xenorhabdus*, or any combination thereof. According to some embodiments, the formulation comprises one or more of *Bacillus amyloliquefaciens*, *Bacillus cereus*, *Bacillus firmus*, *Bacillus*, *lichenformis*, *Bacillus pumilus*, *Bacillus sphaericus*, *Bacillus subtilis*, *Bacillus thuringiensis*, *Chromobacterium subtsugae*, *Pasteuria penetrans*, *Pasteuria usage*, and *Pseudomona fluorescens*. According to some embodiments, a microbe may comprise a fungus of the genus *Alternaria*, *Ampelomyces*, *Arthrobotrys* spp., *Aspergillus*, *Aureobasidium*, *Beauveria*, *Candida* spp., *Colletotrichum*, *Coniothyrium*, *Gigaspora* spp., *Gliocladium*, *Glomus* spp., *Laccaria* spp., *Metarhizium*, *Mucor* spp., *Muscodor*, *Oidiodendron* spp., *Paecilomyces*, *Penicillium* spp., *Pisolithus* spp., *Scleroderma*, *Trichoderma*, *Typhula*, *Ulocladium*, and *Verticillium*. In another aspect, a fungus is *Beauveria bassiana*, *Coniothyrium minitans*, *Gliocladium virens*, *Muscodor albus*, *Paecilomyces lilacinus*, or *Trichoderma polysporum*.

In some embodiments, the formulation comprises one or more lipo-chitooligosaccharides (LCOs), chitin oligomer(s) and/or chitosan oligomer(s) (collectively referred to hereinafter as COs), and/or chitinous compounds.

LCOs, sometimes referred to as symbiotic nodulation (Nod) signals (or Nod factors) or as Myc factors, consist of an oligosaccharide backbone of β-1,4-linked N-acetyl-D-glucosamine ("GlcNAc") residues with an N-linked fatty acyl chain condensed at the non-reducing end. As understood in the art, LCOs differ in the number of GlcNAc residues in the backbone, in the length and degree of saturation of the fatty acyl chain and in the substitutions of reducing and non-reducing sugar residues. See, e.g., Denarie et al., Ann. Rev. Biochem. 65:503 (1996); Diaz et al., Mol. Plant-Microbe Interactions 13:268 (2000); Hungria et al., Soil Biol. Biochem. 29:819 (1997); Hamel et al., Planta 232:787 (2010); and Prome et al., Pure & Appl. Chem. 70(1):55 (1998), the contents and disclosures of which are incorporated herein by reference.

LCOs may be synthetic or obtained from any suitable source. See, e.g., WO 2005/063784, WO 2007/117500 and WO 2008/071674, the contents and disclosures of which are incorporated herein by reference. In some aspects, a synthetic LCO may have the basic structure of a naturally occurring LCO but contains one or more modifications or substitutions, such as those described in Spaink, Crit. Rev. Plant Sci. 54:257 (2000). LCOs and precursors for the construction of LCOs (e.g., COs, which may themselves be useful as a biologically active ingredient) can be synthesized by genetically engineered organisms. See, e.g., Samain et al., Carbohydrate Res. 302:35 (1997); Cottaz et al., Meth. Eng. 7(4):311 (2005); and Samain et al., J. Biotechnol. 72:33 (1999) (e.g., FIG. 1 therein, which shows structures of COs that can be made recombinantly in E. coli harboring different combinations of genes nodBCHL), the contents and disclosures of which are incorporated herein by reference.

LCOs (and derivatives thereof) may be included or utilized in formulations in various forms of purity and can be used alone or in the form of a culture of LCO-producing bacteria or fungi. For example, OPTIMIZE® (commercially available from Monsanto Company (St. Louis, Mo.)) contains a culture of Bradyrhizobium japonicum that produces LCO. Methods to provide substantially pure LCOs include removing the microbial cells from a mixture of LCOs and the microbe, or continuing to isolate and purify the LCO molecules through LCO solvent phase separation followed by HPLC chromatography as described, for example, in U.S. Pat. No. 5,549,718. Purification can be enhanced by repeated HPLC and the purified LCO molecules can be freeze-dried for long-term storage. According to some embodiments, the LCO(s) included in formulations of the present disclosure is/are at least 0.1%, 0.5%, 1%, 2%, 3%, 4%, 5%, 10%, 15%, 20%, 25%, 30%, 35%, 40%, 45%, 50%, 55%, 60%, 65%, 70%, 75%, 80%, 85%, 90%, 91%, 92%, 93%, 94%, 95%, 96%, 97%, 98%, 99% or 100% pure. Formulations and methods in some embodiments may comprise analogues, derivatives, hydrates, isomers, salts and/or solvates of LCOs. LCOs may be incorporated into formulations of the present disclosure in any suitable amount(s)/concentration(s). For example, formulations of the present disclosure comprise about $1\times10^{-20}$ M to about $1\times10^{-1}$ M LCO(s). For example, formulations of the present disclosure can comprise about $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, $1\times10^{-1}$ M of one or more LCOs. In an aspect, the LCO concentration is $1\times10^{-14}$ M to $1\times10^{-5}$ M, $1\times10^{-12}$ M to $1\times10^{-6}$ M, or $1\times10^{-10}$ M to $1\times10^{-7}$ M. In an aspect, the LCO concentration is $1\times10^{-14}$ M to $1\times10^{-5}$ M, $1\times10^{-12}$ M to $1\times10^{-6}$ M, or $1\times10^{-10}$ M to $1\times10^{-7}$ M. The amount/concentration of LCO may be an amount effective to impart a positive trait or benefit to a plant, such as to enhance the disease resistance, growth and/or yield of the plant to which the composition is applied. According to some embodiments, the LCO amount/concentration is not effective to enhance the yield of the plant without beneficial contributions from one or more other constituents of the composition, such as CO and/or one or more pesticides.

In some embodiments the formulation comprises one or more chitin oligomers and/or chitosan oligomers. See, e.g., D'Haeze et al., Glycobiol. 12(6):79R (2002); Demont-Caulet et al., Plant Physiol. 120(1):83 (1999); Hanel et al., Planta 232:787 (2010); Muller et al., Plant Physiol. 124:733 (2000); Robina et al., Tetrahedron 58:521-530 (2002); Rouge et al., Docking of Chitin Oligomers and Nod Factors on Lectin Domains of the LysM-RLK Receptors in the Medicago-Rhizobium Symbiosis, in The Molecular Immunology of Complex Carbohydrates-3 (Springer Science, 2011); Van der Holst et al., Curr. Opin. Struc. Biol. 11:608 (2001); and Wan et al., Plant Cell 21:1053 (2009), the contents and disclosures of which are incorporated by reference. COs may be obtained from any suitable source. For example, COs may be derived from an LCO. For example, in an aspect, formulations comprise one or more COs derived from an LCO obtained (i.e., isolated and/or purified) from a strain of Azorhizobium, Bradyrhizobium (e.g., B. japonicum), Mesorhizobium, Rhizobium (e.g., R. leguminosarum), Sinorhizobium (e.g., S. meliloti), or mycorhizzal fungi (e.g., Glomus intraradicus). Alternatively, the CO may be synthetic. Methods for the preparation of recombinant COs are known in the art. See, e.g., Cottaz et al., Meth. Eng. 7(4):311 (2005); Samain et al., Carbohydrate Res. 302:35 (1997); and Samain et al., J. Biotechnol. 72:33 (1999), the contents and disclosures of which are incorporated herein by reference.

COs (and derivatives thereof) may be included or utilized in formulations in various forms of purity and can be used alone or in the form of a culture of CO-producing bacteria or fungi. According to some embodiments, the CO(s) included in formulations may be at least 0.1%, 0.5%, 1%, 2%, 3%, 4%, 5%, 6%, 7%, 8%, 9%, 10%, 15%, 20%, 30%, 40%, 50%, 60%, 70%, 75%, 80%, 85%, 90%, 91%, 92%, 93%, 94%, 95%, 96%, 97%, 98%, 99%, 99.5% or more pure. It is to be understood that formulations and methods of the present disclosure can comprise hydrates, isomers, salts and/or solvates of COs. COs in some embodiments may be incorporated into formulations in any suitable amount(s)/concentration(s). For example, formulations in some embodiments may comprise about $1\times10^{-20}$ M to about $1\times10^{-1}$ M COs, such as about $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, or $1\times10^{-1}$ M of one or more COs. For example, the CO concentration may be $1\times10^{-14}$ M to $1\times10^{-5}$ M, $1\times10^{-12}$ M to $1\times10^{-6}$ M, or $1\times10^{-10}$ M to $1\times10^{-7}$ M. The amount/concentration of CO may be an amount effective to impart or confer a positive trait or benefit to a plant, such as to enhance the soil microbial environment, nutrient uptake, or increase the growth and/or yield of the plant to which the composition is applied. Formulations in some embodiments may comprise one or more suitable chitinous compounds, such as, for example, chitin (IUPAC: N-[5-[[3-acetylamino-4,5-dihydroxy-6-(hydroxymethyl)oxan-2yl]methoxymethyl]-2-[[5-acetylamino-4,6-dihydroxy-2-(hydroxymethyl)oxan-3-yl]methoxymethyl]-4-hydroxy-6-(hydroxymethyl)oxan-3-ys]ethanamide), chitosan (IUPAC: 5-amino-6-[5-amino-6-[5-amino-4,6-dihydroxy-2-(hydroxymethyl)oxan-3-yl]oxy-4-hydroxy-2-(hydroxymethyl)oxan-3-yl]oxy-2 (hydroxymethyl)oxane-3,4-diol), and isomers, salts and solvates thereof.

Chitins and chitosans, which are major components of the cell walls of fungi and the exoskeletons of insects and crustaceans, are composed of GlcNAc residues. Chitins and chitosans may be obtained commercially or prepared from insects, crustacean shells, or fungal cell walls. Methods for the preparation of chitin and chitosan are known in the art. See, e.g., U.S. Pat. No. 4,536,207 (preparation from crustacean shells) and U.S. Pat. No. 5,965,545 (preparation from crab shells and hydrolysis of commercial chitosan); and Pochanavanich et al., *Lett. Appl. Microbiol.* 35:17 (2002) (preparation from fungal cell walls).

Deacetylated chitins and chitosans may be obtained that range from less than 35% to greater than 90% deacetylation and cover a broad spectrum of molecular weights, e.g., low molecular weight chitosan oligomers of less than 15 kD and chitin oligomers of 0.5 to 2 kD; "practical grade" chitosan with a molecular weight of about 15 kD; and high molecular weight chitosan of up to 70 kD. Chitin and chitosan formulations formulated for seed treatment are commercially available. Commercial products include, for example, ELEXA® (Plant Defense Boosters, Inc.) and BEYOND™ (Agrihouse, Inc.).

In some embodiments, the formulation comprises one or more suitable flavonoids, including, but not limited to, anthocyanidins, anthoxanthins, chalcones, coumarins, flavanones, flavanonols, flavans and isoflavonoids, as well as analogues, derivatives, hydrates, isomers, polymers, salts and solvates thereof. Flavonoids are phenolic compounds having the general structure of two aromatic rings connected by a three-carbon bridge. Classes of flavonoids are known in the art. See, e.g., Jain et al., *J. Plant Biochem. & Biotechnol.* 11:1 (2002); and Shaw et al., *Environ. Microbiol.* 11:1867 (2006), the contents and disclosures of which are incorporated herein by reference. Several flavonoid compounds are commercially available. Flavonoid compounds may be isolated from plants or seeds, e.g., as described in U.S. Pat. Nos. 5,702,752; 5,990,291; and 6,146,668. Flavonoid compounds may also be produced by genetically engineered organisms, such as yeast, See, e.g. Ralston et al., *Plant Physiol.* 137:1375 (2005).

In some embodiments, the formulation comprises one or more flavanones, such as one or more of butin, eriodictyol, hesperetin, hesperidin, homoeriodictyol, isosakuranetin, naringenin, naringin, pinocembrin, poncirin, sakuranetin, sakuranin, and/or sterubin, one or more flavanonols, such as dihydrokaempferol and/or taxifolin, one or more flavans, such as one or more flavan-3-ols (e.g., catechin (C), catechin 3-gallate (Cg), epicatechins (EC), epigallocatechin (EGC) epicatechin 3-gallate (ECg), epigallcatechin 3-gallate (EGCg), epiafzelechin, fisetinidol, gallocatechin (GC), gallcatechin 3-gallate (GCg), guibourtinidol, mesquitol, robinetinidol, theaflavin-3-gallate, theaflavin-3'-gallate, theflavin-3,3'-digallate, thearubigin), flavan-4-ols (e.g., apiforol and/or luteoforol) and/or flavan-3,4-diols (e.g., leucocyanidin, leucodelphinidin, leucofisetinidin, leucomalvidin, luecopelargonidin, leucopeonidin, leucorobinetinidin, melacacidin and/or teracacidin) and/or dimers, trimers, oligomers and/or polymers thereof (e.g., one or more proanthocyanidins), one or more isoflavonoids, such as one or more isoflavones or flavonoid derivatives (e.g. biochanin A, daidzein, formononetin, genistein and/or glycitein), isoflavanes (e.g., equol, ionchocarpane and/or laxifloorane), isoflavandiols, isoflavenes (e.g., glabrene, haginin D and/or 2-methoxyjudaicin), coumestans (e.g., coumestrol, plicadin and/or wedelolactone), pterocarpans, roetonoids, neoflavonoids (e.g, calophyllolide, coutareagenin, dalbergichromene, dalbergin, nivetin), and/or pterocarpans (e.g., bitucarpin A, bitucarpin B, erybraedin A, erybraedin B, erythrabyssin II, erthyrabissin-1, erycristagallin, glycinol, glyceollidins, glyceollins, glycyrrhizol, maackiain, medicarpin, morisianine, orientanol, phaseolin, pisatin, striatine, trifolirhizin), and combinations thereof. Flavonoids and their derivatives may be included in formulations in any suitable form, including, but not limited to, polymorphic and crystalline forms. Flavonoids may be included in formulations in any suitable amount(s) or concentration(s). The amount/concentration of a flavonoid(s) may be an amount effective, which may be indirectly through activity on soil microorganisms or other means, such as to enhance plant nutrition and/or yield. According to some embodiments, a flavonoid amount/concentration may not be effective to enhance the nutrition or yield of the plant without the beneficial contributions from one or more other ingredients of the composition, such as LCO, CO, and/or one or more pesticides.

In some embodiments, the formulation comprises one or more non-flavonoid nod-gene inducer(s), including, but not limited to, jasmonic acid ([1R-[1α,2β(Z)]]-3-oxo-2-(pentenyl)cyclopentaneacetic acid; JA), linoleic acid ((Z,Z)-9,12-Octadecadienoic acid) and/or linolenic acid ((Z,Z,Z)-9,12, 15-octadecatrienoic acid), and analogues, derivatives, hydrates, isomers, polymers, salts and solvates thereof. Jasmonic acid and its methyl ester, methyl jasmonate (MeJA), collectively known as jasmonates, are octadecanoid-based compounds that occur naturally in some plants (e.g., wheat), fungi (e.g., *Botryodiplodia theobromae, Gibberella fujikuroi*), yeast (e.g., *Saccharomyces cerevisiae*) and bacteria (e.g., *Escherichia coli*). Linoleic acid and linolenic acid may be produced in the course of the biosynthesis of jasmonic acid.

Derivatives of jasmonic acid, linoleic acid, and linolenic acid that may be included or used in formulations in some embodiments include esters, amides, glycosides and salts thereof. Representative esters are compounds in which the carboxyl group of linoleic acid, linolenic acid, or jasmonic acid has been replaced with a —COR group, where R is an —OR$^1$ group, in which R$^1$ is: an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a $C_2$-$C_8$ unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Representative amides are compounds in which the carboxyl group of linoleic acid, linolenic acid, or jasmonic acid has been replaced with a —COR group, where R is an NR$^2$R$^3$ group, in which R$^2$ and R$^3$ are each independently: a hydrogen; an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a $C_2$-$C_8$ unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Esters may be prepared by known methods, such as acid-catalyzed nucleophilic addition, wherein the carboxylic acid is reacted with an alcohol in the presence of a catalytic amount of a mineral acid. Amides may also be prepared by known methods, such as by reacting the carboxylic acid with the appropriate amine in the presence of a coupling agent, such as dicyclohexyl carbodiimide (DCC), under neutral conditions. Suitable salts of linoleic acid, linolenic acid and jasmonic acid include, for example, base addition salts. The bases that may be used as reagents to prepare metabolically acceptable base salts of these compounds include those derived from cations such as alkali metal cations (e.g., potassium and sodium) and alkaline earth metal cations (e.g., calcium and magnesium). These salts may be readily prepared by mixing a solution of linoleic acid, linolenic acid, or jasmonic acid with a solution of the base. The salts may be precipitated from solution and collected by filtration, or may be recovered by other means such as by evaporation of the solvent.

In some embodiments, the formulation comprises one or more plant growth regulators including, but not limited to, ethephon and/or thidiazuron.

In some embodiments, the formulation comprises one or more karrakins, including but not limited to 2H-furo[2,3-c]pyran-2-ones, as well as analogues, derivatives, hydrates, isomers, polymers, salts and solvates thereof. Examples of biologically acceptable salts of karrakins include acid addition salts formed with biologically acceptable acids, examples of which include hydrochloride, hydrobromide, sulphate or bisulphate, phosphate or hydrogen phosphate, acetate, benzoate, succinate, fumarate, maleate, lactate, citrate, tartrate, gluconate; methanesulphonate, benzenesulphonate and p-toluenesulphonic acid. Additional biologically acceptable metal salts may include alkali metal salts, with bases, examples of which include the sodium and potassium salts. Karrakins may be incorporated into formulations in any suitable amount(s) or concentration(s). For example, the amount/concentration of a karrakin may be an amount or concentration effective to impart or confer a positive trait or benefit to a plant, such as to enhance the disease resistance, growth and/or yield of the plant to which the composition is applied. In an aspect, a karrakin amount/concentration may not be effective to enhance the disease resistance, growth and/or yield of the plant without beneficial contributions from one or more other ingredients of the composition, such as a LCO, CO and/or one or more pesticides.

In some embodiments, the formulation comprises one or more anthocyanidins and/or anthoxanthins, such as one or more of cyanidin, delphinidin, malvidin, pelargonidin, peonidin, petunidin, flavones (e.g., apigenin, baicalein, chrysin, 7,8-dihydroxyflavone, diosmin, flavoxate, 6-hydroxyflavone, luteolin, scutellarein, tangeritin and/or wogonin) and/or flavonols (e.g., amurensin, astragalin, azaleatin, azalein, fisetin, furanoflavonols galangin, gossypetin, 3-hydroxyflavone, hyperoside, icariin, isoquercetin, kaempferide, kaempferitrin, kaempferol, isorhamnetin, morin, myricetin, myricitrin, natsudaidain, pachypodol, pyranoflavonols quercetin, quericitin, rhamnazin, rhamnetin, robinin, rutin, spiraeoside, troxerutin and/or zanthorhamnin), and combinations thereof.

In some embodiments, the formulation comprises one or more gluconolactone and/or an analogue, derivative, hydrate, isomer, polymer, salt and/or solvate thereof. Gluconolactone may be incorporated into formulations in any suitable amount(s)/concentration(s). For example, the amount/concentration of a gluconolactone amount/concentration may be an amount effective to impart or confer a positive trait or benefit to a plant, such as to enhance the disease resistance, growth and/or yield of the plant to which the composition is applied. In an aspect, the gluconolactone amount/concentration may not be effective to enhance the disease resistance, growth and/or yield of the plant without beneficial contributions from one or more other ingredients of the composition, such as a LCO, CO and/or one or more pesticides.

In some embodiments, the formulation comprises one or more nutrient(s) and/or fertilizer(s), such as organic acids (e.g., acetic acid, citric acid, lactic acid, malic acid, taurine, etc.), macrominerals (e.g., phosphorous, calcium, magnesium, potassium, sodium, iron, etc.), trace minerals (e.g., boron, cobalt, chloride, chromium, copper, fluoride, iodine, iron, manganese, molybdenum, selenium, zinc, etc.), vitamins, (e.g., vitamin A, vitamin B complex (i.e., vitamin $B_1$, vitamin $B_2$, vitamin $B_3$, vitamin $B_5$, vitamin $B_6$, vitamin $B_7$, vitamin $B_8$, vitamin $B_9$, vitamin $B_{12}$, choline) vitamin C, vitamin D, vitamin E, vitamin K.), and/or carotenoids (α-carotene, β-carotene, cryptoxanthin, lutein, lycopene, zeaxanthin, etc.), and combinations thereof. In an aspect, formulations of the present disclosure may comprise macro- and micronutrients of plants or microbes, including phosphorous, boron, chlorine, copper, iron, manganese, molybdenum and/or zinc. According to some embodiments, formulations may comprise one or more beneficial micronutrients. Non-limiting examples of micronutrients for use in formulations described herein may include vitamins, (e.g., vitamin A, vitamin B complex (i.e., vitamin B1, vitamin B2, vitamin B3, vitamin B5, vitamin B6, vitamin B7, vitamin B8, vitamin B9, vitamin B12, choline) vitamin C, vitamin D, vitamin E, vitamin K, carotenoids (α-carotene, β-carotene, cryptoxanthin, lutein, lycopene, zeaxanthin, etc.), macrominerals (e.g., phosphorous, calcium, magnesium, potassium, sodium, iron, etc.), trace minerals (e.g., boron, cobalt, chloride, chromium, copper, fluoride, iodine, iron, manganese, molybdenum, selenium, zinc, etc.), organic acids (e.g., acetic acid, citric acid, lactic acid, malic aclid, taurine, etc.), and combinations thereof. In a particular aspect, formulations may comprise phosphorous, boron, chlorine, copper, iron, manganese, molybdenum, and/or zinc, and combinations thereof. For formulations comprising phosphorous, it is envisioned that any suitable source of phosphorous may be used. For example, phosphorus may be derived from a rock phosphate source, such as monoammonium phosphate, diammonium phosphate, monocalcium phosphate, super phosphate, triple super phosphate, and/or ammonium polyphosphate, an organic phosphorous source, or a phosphorous source capable of solubilization by one or more microorganisms (e.g., *Penicillium bilaiae*).

Methods of Preparing Treated Seeds

As discussed above, the liquid agrochemical formulations described herein can be useful, for example, for the preparation of treated seeds having improved resistance to one or more agricultural pests. Accordingly, provided herein are methods of preparing treated seeds.

For example, the method of preparing a treated seed can comprise mixing a containerized liquid agrochemical formulation as described herein to form a homogeneous seed treatment mixture, and applying the seed treatment mixture to a seed. In other embodiments, the method of preparing a treated seed can comprise individually applying each layer of the liquid agrochemical formulation as described herein to a seed.

Typically, the containerized liquid formulation is mixed to form a homogeneous seed treatment mixture shortly prior to application of the seed treatment mixture to the seed. If the seed treatment mixture is mixed shortly prior to application to a seed, any storage stability issues resulting from the mixture of the different liquid layers are inconsequential.

In some embodiments, the liquid formulation is mixed for at least about 1 minute, at least about 2 minutes, at least about 3 minutes, at least about 4 minutes, at least about 5 minutes, at least about 6 minutes, at least about 7 minutes, at least about 8 minutes, at least about 9 minutes, or at least about 10 minutes.

Types of Seeds

The methods described herein can be used in connection with any species of plant and/or the seeds thereof. In some embodiments, however, the methods are used in connection with seeds of plant species that are agronomically important. In particular, the seeds can be of corn, peanut, canola/rapeseed, soybean, cucurbits, crucifers, cotton, beets, rice, sorghum, sugar beet, wheat, barley, rye, sunflower, tomato, sugarcane, tobacco, oats, as well as other vegetable and leaf crops. In some embodiments, the seed is corn, soybean, or cotton seed. The seed may be a transgenic seed from which a transgenic plant can grow and incorporate a transgenic event that confers, for example, tolerance to a particular herbicide or combination of herbicides, increased disease resistance, enhanced tolerance to stress and/or enhanced yield. Transgenic seeds include, but are not limited to, seeds of corn, soybean and cotton.

Methods of Applying the Seed Coating

The seed can be coated using a variety of methods known in the art. For example, the coating process can comprise spraying the seed treatment mixture onto the seed while agitating the seed in an appropriate piece of equipment such as a tumbler or a pan granulator.

In one embodiment, when coating seed on a large scale (for example a commercial scale), the seed coating may be applied using a continuous process. Typically, seed is introduced into the treatment equipment (such as a tumbler, a mixer, or a pan granulator) either by weight or by flow rate. The amount of treatment mixture that is introduced into the treatment equipment can vary depending on the seed weight to be coated, surface area of the seed, the concentration of the nematicide and/or other active ingredients in the treatment composition, the desired concentration on the finished seed, and the like. The seed treatment mixture can be applied to the seed by a variety of means, for example by a spray nozzle or revolving disc. The amount of liquid is typically determined by the assay of the formulation and the required rate of active ingredient necessary for efficacy. As the seed falls into the treatment equipment the seed can be treated (for example by misting or spraying with the seed treatment composition) and passed through the treater under continual movement/tumbling where it can be coated evenly and dried before storage or use.

In another embodiment, the seed coating may be applied using a batch process. For example, a known weight of seeds can be introduced into the treatment equipment (such as a tumbler, a mixer, or a pan granulator). A known volume of seed treatment mixture can be introduced into the treatment equipment at a rate that allows the seed treatment mixture to be applied evenly over the seeds. During the application, the seed can be mixed, for example by spinning or tumbling. The seed can optionally be dried or partially dried during the tumbling operation. After complete coating, the treated sample can be removed to an area for further drying or additional processing, use, or storage.

In an alternative embodiment, the seed coating may be applied using a semi-batch process that incorporates features from each of the batch process and continuous process embodiments set forth above.

In still another embodiment, seeds can be coated in laboratory size commercial treatment equipment such as a tumbler, a mixer, or a pan granulator by introducing a known weight of seeds in the treater, adding the desired amount of seed treatment composition, tumbling or spinning the seed and placing it on a tray to thoroughly dry.

Treated Seeds

Also provided is a treated seed that has been treated with a seed treatment mixture prepared as described above. The seed can be treated with the seed treatment mixture using one of the seed treatment methods described above. The seed may be of any plant species, as described above.

EXAMPLES

The following examples are to be considered as merely illustrative, and are not intended to limit the scope of this invention.

Example 1

A study was conducted to evaluate whether the layering process provides additional benefits when a biologically active ingredient is included in the formulation.

Layered blends were prepared with a commercially available fungicide and/or insecticide package, and optionally further comprising a biologically active ingredient. With the exception of Test Formulations 1B and 1C, test formulations were prepared by carefully placing each component into a 1 liter container in order of decreasing density to create a layered sample. In Test Formulations 1B and 1C, the biologically active ingredient was placed in the container at or near the top of the layered sample despite its relatively high density. The recipe for each test formulation is listed below in Tables 1A-1F.

The components labeled Fungicide A, Fungicide B, and Fungicide C are each commercially-available compositions comprising a fungicidal active ingredient. Each composition is in the form of a suspension concentrate. The component labeled Insecticide A is a commercially-available composition comprising an insecticidal active ingredient, and is in the form of a suspension concentrate. The component labeled Biological Active A is a composition comprising a biologically active ingredient, and is in the form of a suspension concentrate. Nematicide A is a composition comprising a nematicidal active ingredient, and is in the form of a suspension concentrate. The component labeled Non-Active Component A is a surfactant.

TABLE 1A

Test Formulation A

| Addition Order | Component Description | Density (g/ml) | Volume (ml) | Weight (g) |
|---|---|---|---|---|
| 4 | Fungicide A | 1.10 | 46.6 | 51.24 |
| 5 | Fungicide B | 1.09 | 74.5 | 81.23 |
| 3 | Fungicide C | 1.13 | 29.8 | 33.80 |
| 1 | Nematicide A | 1.17 | 558.9 | 653.95 |
| 2 | Color Coat Red | 1.15 | 91.3 | 104.99 |
| 6 | Non-Active Component A | 1.07 | 6.2 | 6.65 |
| Total | | | 807.3 | 931.85 |

TABLE 1B

Test Formulation B

| Addition Order | Component Description | Density (g/ml) | Volume (ml) | Weight (g) |
|---|---|---|---|---|
| 4 | Fungicide A | 1.10 | 44.9 | 49.41 |
| 5 | Fungicide B | 1.09 | 71.9 | 78.33 |
| 3 | Fungicide C | 1.13 | 28.7 | 32.60 |
| 1 | Nematicide A | 1.17 | 539.0 | 630.59 |
| 7 | Biological Active A | 1.15 | 29.9 | 34.43 |
| 6 | Non-Active Component A | 1.07 | 6.0 | 6.41 |
| 2 | Color Coat Red | 1.15 | 88.0 | 101.24 |
| Total | | | 808.4 | 933.00 |

TABLE 1C

Test Formulation C

| Addition Order | Component Description | Density (g/ml) | Volume (ml) | Weight (g) |
|---|---|---|---|---|
| 4 | Fungicide A | 1.10 | 44.9 | 49.41 |
| 5 | Fungicide B | 1.09 | 71.9 | 78.33 |
| 3 | Fungicide C | 1.13 | 28.7 | 32.60 |
| 1 | Nematicide A | 1.17 | 539.0 | 630.59 |
| 7 | Biological Active A | 1.15 | 29.9 | 34.43 |
| 6 | Non-Active Component A | 1.07 | 6.0 | 6.41 |
| 2 | Color Coat Red | 1.15 | 88.0 | 101.24 |
| 8 | Water | 1.00 | 75.5 | 75.46 |
| Total | | | 883.91 | 1009.87 |

TABLE 1D

Test Formulation D

| Addition Order | Component Description | Density (g/ml) | Volume (ml) | Weight (g) |
|---|---|---|---|---|
| 1 | Insecticide A | 1.23 | 189.3 | 232.80 |
| 5 | Fungicide A | 1.10 | 35.5 | 39.04 |
| 6 | Fungicide B | 1.09 | 56.8 | 61.89 |
| 4 | Fungicide C | 1.13 | 22.7 | 25.76 |
| 2 | Nematicide A | 1.17 | 425.9 | 498.25 |
| 3 | Color Coat Red | 1.15 | 74.3 | 85.43 |
| Total | | | 804.4 | 943.16 |

TABLE 1E

Test Formulation E

| Addition Order | Component Description | Density (g/ml) | Volume (ml) | Weight (g) |
|---|---|---|---|---|
| 1 | Insecticide A | 1.23 | 183.4 | 225.52 |
| 5 | Fungicide A | 1.10 | 34.4 | 37.82 |
| 6 | Fungicide B | 1.09 | 55.0 | 59.96 |
| 4 | Fungicide C | 1.13 | 22.0 | 24.95 |
| 2 | Nematicide A | 1.17 | 412.5 | 483.68 |
| 3 | Biological Active A | 1.15 | 22.9 | 24.07 |
| 4 | Color Coat Red | 1.15 | 72.0 | 86.36 |
| Total | | | 802.2 | 941.35 |

TABLE 1F

Test Formulation F

| Addition Order | Component Description | Density (g/ml) | Volume (ml) | Weight (g) |
|---|---|---|---|---|
| 1 | Insecticide A | 1.23 | 183.4 | 225.52 |
| 6 | Fungicide A | 1.10 | 34.4 | 37.82 |
| 7 | Fungicide B | 1.09 | 55.0 | 59.96 |
| 5 | Fungicide C | 1.13 | 22.0 | 24.95 |
| 2 | Nematicide A | 1.17 | 412.5 | 483.68 |
| 3 | Biological Active A | 1.15 | 22.9 | 26.36 |
| 4 | Color Coat Red | 1.15 | 72.0 | 86.36 |
| 8 | Water | 1.00 | 80.7 | 80.68 |
| Total | | | 802.2 | 1024.31 |

The layered blends were mixed 3 days after layering. Water was added to the mixed blend as noted in Table 1G below and this slurry was used to treat a soybean seed.

TABLE 1G

Slurry Blends

| Slurry Name | Volume (ml) | Weight (g) | Component |
|---|---|---|---|
| 1A | 4.03 | 4.03 | Water |
|  | 11.89 | 13.63 | Custom Layered Blend |
| 1B | 4.03 | 4.03 | Water |
|  | 11.89 | 13.63 | Custom Layered Blend |
| 1C | 4.03 | 4.03 | Water |
|  | 11.89 | 13.63 | Custom Layered Blend |
| 1D | 3.85 | 3.85 | Water |
|  | 15.25 | 17.79 | Custom Layered Blend |
| 1E | 3.85 | 3.85 | Water |
|  | 15.25 | 17.79 | Custom Layered Blend |
| 1F | 3.85 | 3.85 | Water |
|  | 15.25 | 17.79 | Custom Layered Blend |

Samples of the mixed blend for Formulations of Tables 1B, 1C, 1E and 1F and soybeans treated with slurry blends of 1B, 1C, 1E and 1F were then tested for CFU (colony-forming unit) count 1 day after the layered blends were mixed (4 days after layering). Publicly available methods were used to isolate and determine the CFU count. Formulations of Tables 1A and 1D and slurry blends 1A and 1D were not tested for CFU count as they did not contain a biologically active ingredient. The results are presented in Table 1H.

TABLE 1H

CFU Count of Mixed Blends and Treated Soybean Seeds

| Sample ID | Number of Seeds: | CFU Count #1 | CFU Count #2 | CFU Count #3 | CFU Count Mean | Dilution Factor ($\times 10^1$) | Actual CFU Count/ seed ($\times 10^3$) | Actual CFU Count/ml ($\times 10^6$) |
|---|---|---|---|---|---|---|---|---|
| 1B mixed blend | N/A | 81 | 90 | 71 | 80.67 | 19.800 | — | 16.0 |
| 1C mixed blend | N/A | 75 | 69 | 76 | 73.33 | 20.000 | — | 14.7 |
| 1E mixed blend | N/A | 33 | 31 | 42 | 35.33 | 19.200 | — | 6.77 |
| 1F mixed blend | N/A | 42 | 29 | 36 | 35.67 | 19.400 | — | 6.92 |
| 1B treated soybean seeds | 30 | 48 | 45 | 40 | 44.33 | 5.00 | 2.22 | — |
| 1C treated soybean seeds | 30 | 50 | 57 | 62 | 56.33 | 5.00 | 2.82 | — |
| 1E treated soybean seeds | 30 | 26 | 30 | 27 | 27.67 | 5.00 | 1.38 | — |
| 1F treated soybean seeds | 30 | 42 | 43 | 44 | 43.00 | 5.00 | 2.15 | — |

The CFU count results shown in Table 1H demonstrate that the biologically active ingredient was still active after mixing as a layered blend and after mixing the layered blend and applying to a soybean seed.

Example 2

Two formulation types were tested in the following example: a Fungicide formulation comprising only fungicidal active ingredients and a Fungicide+Insecticide formulation comprising both fungicidal and insecticidal active ingredients. The components present in each formulation type are listed in Tables 2A and 2B below.

TABLE 2A

| Fungicide Formulation | | | |
|---|---|---|---|
| Component | Density (g/ml) | Volume (ml) | Weight (g) |
| Fungicide B | 1.09 | 248.4 | 270.77 |
| Fungicide A | 1.10 | 155.3 | 170.78 |
| Fungicide C | 1.13 | 99.4 | 112.68 |
| Crystallization Inhibitor A | 1.07 | 20.7 | 22.15 |
| Color Coat Red | 1.15 | 304.3 | 349.95 |
| Total | | 828.1 | 926.33 |

TABLE 2B

| Fungicide + Insecticide Formulation | | | |
|---|---|---|---|
| Component | Density (g/ml) | Volume (ml) | Weight (g) |
| Fungicide B | 1.09 | 124.2 | 135.39 |
| Fungicide A | 1.10 | 77.6 | 85.39 |
| Fungicide C | 1.13 | 49.7 | 56.34 |
| Insecticide A | 1.23 | 414.0 | 509.25 |
| Color Coat Red | 1.15 | 162.5 | 186.88 |
| Total | | 828.0 | 973.25 |

Each component was shaken in its original container for approximately 20 minutes prior to use. To prepare the test formulations, each component was added to the container one at a time, such that the material entered the container by hitting the side wall, and flowed slowly enough to minimize disruption of any lower layers.

Test compositions based on each formulation type were prepared using different orders of addition. In the conventional order of addition, components are added to the container in order of decreasing volume, except that the colorant is always added last. In the density-based order of addition, the components are added to the container in order of decreasing density. The orders of addition are outlined in below in Table 3.

TABLE 3

| Order of Addition | | |
|---|---|---|
| Type | Formulation | Order of Addition |
| Density | Fungicide | Color Coat Red → Fungicide C → Fungicide A → Fungicide B → Non-Active Component A |
| Density | Fungicide + Insecticide | Insecticide A → Color Coat Red → Fungicide C → Fungicide A → Fungicide B |
| Conventional | Fungicide | Fungicide B → Fungicide A → Fungicide C → Non-Active Component A → Color Coat Red |
| Conventional | Fungicide + Insecticide | Insecticide A → Fungicide B → Fungicide A → Fungicide C → Color Coat Red |

Different test compositions were subjected to different mixing procedures. The mixing procedures used in the following examples are summarized in Table 4. The "static" procedure represents a control, with no perturbation of the container. The "tipped" procedure involves the container being inverted three times, which simulates the drum being moved during shipment. The "mixed" procedure simulates the stirring procedure that would be performed by the end user prior to application.

TABLE 4

| Mixing Procedures | | | |
|---|---|---|---|
| Type | Description | Inversions | Mixing Time |
| Static | No Stirring, No Inversion | 0 | 0 |
| Tipped | Inverted, No Stirring | 3 | 0 |
| Mixed | Stirred, No Inversion | 0 | 1 minute |

Each container was stored under the specified conditions (e.g., in an oven or on a lab bench) with no agitation beyond that prescribed in Table 4 above. Containers stored under heat/cool conditions ("HC") were subjected to a cycle of 12 hours at 50° C. followed by 12 hours at ambient temperature. Containers stored under accelerated aging conditions ("AA") were stored in an oven at 40° C. and 75% relative humidity.

During the course of each experiment, one or more containers were removed at specified times for testing. Containers that were stored in an oven were allowed to come to room temperature by leaving on the lab bench overnight. All containers were homogenized for 5 minutes prior to testing.

The test compositions were evaluated for their viscosity using a BROOKFIELD rheometer. The stability of the test compositions was also evaluated by measuring the weight of the solid precipitate present in the container. Test results for the Table 2A formulations and Table 2B formulations are presented below in Tables 5A and 5B, respectively.

TABLE 5A

| Order of Addition | Mixing | Storage | Storage Time (Days) | Viscosity (cP) | Slurry precip wt (g) |
|---|---|---|---|---|---|
| Density | Mixed | ambient | 0 | 43.42 | 0.344 |
| Conventional | Mixed | ambient | 0 | 47.03 | 0.361 |
| Density | Static | ambient | 0 | 41.68 | 0.499 |
| Conventional | Static | ambient | 0 | 46.71 | 0.202 |
| Density | Tipped | ambient | 0 | 40.89 | 0.336 |
| Conventional | Tipped | ambient | 0 | 40.91 | 0.346 |
| Density | Mixed | HC | 3 | 64.46 | 1.147 |
| Conventional | Mixed | HC | 3 | 60.32 | 0.863 |
| Density | Static | HC | 3 | 44.28 | 1.128 |
| Conventional | Static | HC | 3 | 60.45 | 1.977 |
| Density | Tipped | HC | 3 | 60.65 | 1.992 |
| Conventional | Tipped | HC | 3 | 58.89 | 9.478 |
| Density | Mixed | ambient | 14 | 42.93 | 0.333 |
| Conventional | Mixed | ambient | 14 | 44.65 | 0.362 |
| Density | Static | ambient | 14 | 45.63 | 0.578 |
| Conventional | Static | ambient | 14 | 43.87 | 0.176 |
| Density | Tipped | ambient | 14 | 38.16 | 0.340 |
| Conventional | Tipped | ambient | 14 | 40.30 | 0.896 |
| Density | Mixed | AA | 14 | 65.95 | 1.763 |
| Conventional | Mixed | AA | 14 | 61.71 | 2.555 |
| Density | Static | AA | 14 | 37.18 | 3.716 |
| Conventional | Static | AA | 14 | 45.04 | 3.102 |
| Density | Tipped | AA | 14 | 61.99 | 3.804 |
| Conventional | Tipped | AA | 14 | 45.16 | 1.841 |
| Density | Mixed | ambient | 30 | 45.22 | 1.323 |
| Conventional | Mixed | ambient | 30 | 47.20 | 1.097 |
| Density | Static | ambient | 30 | 50.59 | 0.922 |
| Conventional | Static | ambient | 30 | 48.76 | 0.485 |
| Density | Tipped | ambient | 30 | 39.75 | 0.900 |
| Conventional | Tipped | ambient | 30 | 50.13 | 0.921 |
| Density | Mixed | AA | 30 | 83.56 | 1.640 |
| Conventional | Mixed | AA | 30 | 79.76 | 1.372 |
| Density | Static | AA | 30 | 46.79 | 2.625 |
| Conventional | Static | AA | 30 | 51.93 | 3.113 |
| Density | Tipped | AA | 30 | 70.57 | 4.097 |
| Conventional | Tipped | AA | 30 | 56.44 | 4.104 |
| Density | Mixed | ambient | 60 | 47.15 | 2.294 |
| Conventional | Mixed | ambient | 60 | 50.99 | 1.549 |
| Density | Static | ambient | 60 | 54.21 | 0.967 |
| Conventional | Static | ambient | 60 | 44.53 | 2.664 |
| Density | Tipped | ambient | 60 | 42.81 | 1.523 |
| Conventional | Tipped | ambient | 60 | 41.89 | 2.030 |
| Density | Mixed | AA | 60 | 89.38 | 6.323 |
| Conventional | Mixed | AA | 60 | 80.85 | 2.573 |
| Density | Static | AA | 60 | 47.53 | 8.484 |
| Conventional | Static | AA | 60 | 52.52 | 8.716 |
| Density | Tipped | AA | 60 | 62.65 | 8.275 |
| Conventional | Tipped | AA | 60 | 68.19 | 8.119 |
| Density | Mixed | ambient | 90 | 33.28 | 0.481 |
| Conventional | Mixed | ambient | 90 | 33.89 | 3.833 |
| Density | Static | ambient | 90 | 21.81 | 2.674 |
| Conventional | Static | ambient | 90 | 28.96 | 3.837 |
| Density | Tipped | ambient | 90 | 29.04 | 4.877 |
| Conventional | Tipped | ambient | 90 | 30.97 | 3.790 |
| Density | Mixed | AA | 90 | 79.08 | 8.834 |
| Conventional | Mixed | AA | 90 | 78.28 | 6.416 |
| Density | Static | AA | 90 | 46.84 | 5.616 |
| Conventional | Static | AA | 90 | 47.75 | 9.474 |
| Density | Tipped | AA | 90 | 67.51 | 8.715 |
| Conventional | Tipped | AA | 90 | 76.05 | 4.205 |
| Density | Mixed | ambient | 120 | 36.80 | 0.299 |
| Conventional | Mixed | ambient | 120 | 43.00 | 0.368 |
| Density | Static | ambient | 120 | 25.34 | 0.903 |
| Conventional | Static | ambient | 120 | 33.57 | 1.654 |
| Density | Tipped | ambient | 120 | 33.55 | 2.528 |
| Conventional | Tipped | ambient | 120 | 32.08 | 0.798 |
| Density | Mixed | AA | 120 | 77.43 | 2.061 |
| Conventional | Mixed | AA | 120 | 74.15 | 2.712 |
| Density | Static | AA | 120 | 31.38 | 6.387 |
| Conventional | Static | AA | 120 | 44.17 | 7.218 |
| Density | Tipped | AA | 120 | 51.38 | 6.372 |
| Conventional | Tipped | AA | 120 | 72.94 | 4.000 |

TABLE 5B

| Order of Addition | Mixing | Storage | Storage Time (Days) | Viscosity (cP) | Slurry precip wt (g) |
|---|---|---|---|---|---|
| Density | Mixed | ambient | 0 | 58.05 | 0.196 |
| Conventional | Mixed | ambient | 0 | 67.40 | 0.080 |
| Density | Static | ambient | 0 | 63.46 | 0.130 |
| Conventional | Static | ambient | 0 | 62.43 | 0.183 |
| Density | Tipped | ambient | 0 | 60.52 | 0.1200 |
| Conventional | Tipped | ambient | 0 | 67.50 | 0.066 |
| Density | Mixed | HC | 3 | 375.79 | 0.185 |
| Conventional | Mixed | HC | 3 | 512.43 | 0.105 |
| Density | Static | HC | 3 | 74.97 | 1.461 |
| Conventional | Static | HC | 3 | 69.22 | 1.729 |
| Density | Tipped | HC | 3 | 269.18 | 0.662 |
| Conventional | Tipped | HC | 3 | 269.34 | 1.075 |
| Density | Mixed | ambient | 14 | 87.74 | 0.093 |
| Conventional | Mixed | ambient | 14 | 74.37 | 0.060 |
| Density | Static | ambient | 14 | 52.92 | 0.077 |
| Conventional | Static | ambient | 14 | 55.79 | 0.075 |
| Density | Tipped | ambient | 14 | 56.20 | 0.061 |
| Conventional | Tipped | ambient | 14 | 59.43 | 0.076 |
| Density | Mixed | AA | 14 | 245.14 | 0.065 |
| Conventional | Mixed | AA | 14 | 237.92 | 0.069 |
| Density | Static | AA | 14 | 56.63 | 0.715 |
| Conventional | Static | AA | 14 | 59.10 | 0.412 |
| Density | Tipped | AA | 14 | 131.78 | 0.444 |
| Conventional | Tipped | AA | 14 | 116.24 | 0.427 |
| Density | Mixed | ambient | 30 | 78.33 | 0.140 |
| Conventional | Mixed | ambient | 30 | 106.05 | 0.060 |
| Density | Static | ambient | 30 | 51.21 | 0.110 |
| Conventional | Static | ambient | 30 | 54.17 | 0.109 |
| Density | Tipped | ambient | 30 | 56.13 | 0.111 |
| Conventional | Tipped | ambient | 30 | 59.57 | 0.070 |
| Density | Mixed | AA | 30 | 245.66 | 0.060 |
| Conventional | Mixed | AA | 30 | 255.64 | 0.050 |
| Density | Static | AA | 30 | 59.38 | 1.327 |
| Conventional | Static | AA | 30 | 61.46 | 0.376 |
| Density | Tipped | AA | 30 | 103.89 | 0.429 |
| Conventional | Tipped | AA | 30 | 119.16 | 0.517 |
| Density | Mixed | ambient | 60 | 348.92 | 0.096 |
| Conventional | Mixed | ambient | 60 | 261.04 | 0.059 |
| Density | Static | ambient | 60 | 52.85 | 0.072 |
| Conventional | Static | ambient | 60 | 56.01 | 0.091 |
| Density | Tipped | ambient | 60 | 57.10 | 0.112 |
| Conventional | Tipped | ambient | 60 | 61.66 | 0.059 |
| Density | Mixed | AA | 60 | 198.51 | 0.076 |
| Conventional | Mixed | AA | 60 | 218.82 | 0.039 |
| Density | Static | AA | 60 | 53.30 | 0.974 |
| Conventional | Static | AA | 60 | 60.35 | 0.842 |

TABLE 5B-continued

| Order of Addition | Mixing | Storage | Storage Time (Days) | Viscosity (cP) | Slurry precip wt (g) |
|---|---|---|---|---|---|
| Density | Tipped | AA | 60 | 119.95 | 0.471 |
| Conventional | Tipped | AA | 60 | 123.25 | 0.450 |
| Density | Mixed | ambient | 90 | 101.87 | 0.230 |
| Conventional | Mixed | ambient | 90 | 83.48 | 0.222 |
| Density | Static | ambient | 90 | 60.39 | 0.181 |
| Conventional | Static | ambient | 90 | 63.72 | 0.130 |
| Density | Tipped | ambient | 90 | 67.92 | 0.173 |
| Conventional | Tipped | ambient | 90 | 65.61 | 0.094 |
| Density | Mixed | AA | 90 | 209.95 | 2.243 |
| Conventional | Mixed | AA | 90 | 221.23 | 0.463 |
| Density | Static | AA | 90 | 66.49 | 0.756 |
| Conventional | Static | AA | 90 | 64.94 | 0.902 |
| Density | Tipped | AA | 90 | 149.86 | 0.424 |
| Conventional | Tipped | AA | 90 | 135.58 | 1.322 |
| Density | Mixed | ambient | 120 | 400.11 | 0.081 |
| Conventional | Mixed | ambient | 120 | 406.67 | 0.641 |
| Density | Static | ambient | 120 | 53.94 | 0.637 |
| Conventional | Static | ambient | 120 | 54.36 | 0.284 |
| Density | Tipped | ambient | 120 | 59.00 | 0.155 |
| Conventional | Tipped | ambient | 120 | 69.28 | 0.171 |
| Density | Mixed | AA | 120 | 274.14 | not enough sample |
| Conventional | Mixed | AA | 120 | 263.40 | not enough sample |
| Density | Static | AA | 120 | 60.75 | 1.432 |
| Conventional | Static | AA | 120 | 69.22 | 3.158 |
| Density | Tipped | AA | 120 | 138.13 | 0.776 |
| Conventional | Tipped | AA | 120 | 136.07 | 1.056 |

Example 3

Test compositions were prepared corresponding to each formulation type, order of addition, and mixing procedure described in Example 2. Additionally, each container was stored under the specified conditions as described in Example 2.

Particle size measurements of each test composition were taken using a BECKMAN COULTER particle size analyzer. The pH of each test composition was also evaluated. Test results for the Fungicide-only test formulations and the Fungicide+Insecticide test formulations are presented below in Tables 6A and 6B, respectively.

"Median PS" and "Mean PS" correspond to the median and mean particle size of the composition. "d10" and "d 90" correspond to the value at which 10% or 90% of the total particles sampled had a diameter less than or equal to the d10 value or d90 value, respectively.

TABLE 6A

| Order of Addition | Mixing | Storage | Storage Time (Days) | Median PS (μm) | Mean PS (μm) | Std Dev (μm) | d10 (μm) | d90 (μm) | pH |
|---|---|---|---|---|---|---|---|---|---|
| Density | Mixed | ambient | 0 | 1.241 | 1.701 | 1.74 | 0.204 | 3.938 | 7.77 |
| Conventional | Mixed | ambient | 0 | 1.061 | 1.422 | 1.337 | 0.196 | 3.809 | 7.76 |
| Density | Static | ambient | 0 | 1.157 | 1.810 | 2.029 | 0.21 | 4.753 | 7.80 |
| Conventional | Static | ambient | 0 | 1.828 | 3.882 | 5.082 | 0.25 | 13.84 | 7.74 |
| Density | Tipped | ambient | 0 | 2.172 | 1.869 | 1.071 | 0.611 | 3.184 | 7.83 |
| Conventional | Tipped | ambient | 0 | 0.924 | 1.171 | 0.679 | 0.223 | 2.118 | 7.87 |
| Density | Mixed | HC | 3 | 1.119 | 1.904 | 2.359 | 0.211 | 5.292 | 8.17 |
| Conventional | Mixed | HC | 3 | 1.365 | 1.177 | 0.731 | 0.204 | 2.086 | 8.21 |
| Density | Static | HC | 3 | 1.411 | 1.322 | 0.632 | 0.218 | 2.076 | 8.11 |
| Conventional | Static | HC | 3 | 3.078 | 6.07 | 10.10 | 0.352 | 11.54 | 8.15 |
| Density | Tipped | HC | 3 | 4.376 | 6.970 | 7.177 | 0.374 | 19.04 | 8.09 |
| Conventional | Tipped | HC | 3 | 2.872 | 5.295 | 6.116 | 0.432 | 15.12 | 8.15 |
| Density | Mixed | ambient | 14 | 1.171 | 1.586 | 1.481 | 0.201 | 4.242 | 8.04 |
| Conventional | Mixed | ambient | 14 | 1.240 | 1.987 | 2.229 | 0.223 | 4.683 | 8.14 |
| Density | Static | ambient | 14 | 1.241 | 1.724 | 1.551 | 0.245 | 4.330 | 7.99 |
| Conventional | Static | ambient | 14 | 1.169 | 1.629 | 1.498 | 0.228 | 4.142 | 8.01 |
| Density | Tipped | ambient | 14 | 1.566 | 2.378 | 2.738 | 0.307 | 5.101 | 8.14 |
| Conventional | Tipped | ambient | 14 | 1.062 | 1.270 | 1.044 | 0.232 | 2.210 | 7.99 |
| Density | Mixed | AA | 14 | 1.620 | 2.754 | 3.198 | 0.234 | 6.750 | 7.78 |
| Conventional | Mixed | AA | 14 | 1.891 | 3.115 | 3.026 | 0.292 | 7.723 | 7.77 |
| Density | Static | AA | 14 | 1.135 | 2.906 | 4.310 | 0.183 | 7.729 | 7.79 |
| Conventional | Static | AA | 14 | 1.632 | 2.934 | 3.828 | 0.335 | 6.421 | 7.78 |
| Density | Tipped | AA | 14 | 2.343 | 5.336 | 8.829 | 0.261 | 12.43 | 7.76 |
| Conventional | Tipped | AA | 14 | 0.794 | 1.058 | 0.748 | 0.200 | 2.120 | 7.78 |
| Density | Mixed | ambient | 30 | 1.232 | 1.808 | 1.823 | 0.223 | 4.602 | 7.76 |
| Conventional | Mixed | ambient | 30 | 1.309 | 1.880 | 1.814 | 0.232 | 4.574 | 7.72 |
| Density | Static | ambient | 30 | 1.317 | 2.009 | 2.047 | 0.275 | 4.895 | 7.79 |
| Conventional | Static | ambient | 30 | 1.183 | 1.739 | 1.743 | 0.218 | 4.454 | 7.74 |
| Density | Tipped | ambient | 30 | 1.824 | 1.265 | 1.812 | 0.233 | 4.365 | 7.85 |
| Conventional | Tipped | ambient | 30 | 1.175 | 1.629 | 1.524 | 0.215 | 4.180 | 7.82 |
| Density | Mixed | AA | 30 | 1.888 | 3.169 | 3.041 | 0.288 | 7.747 | 7.99 |
| Conventional | Mixed | AA | 30 | 2.194 | 3.949 | 5.399 | 0.333 | 8.616 | 8.09 |
| Density | Static | AA | 30 | 1.473 | 4.049 | 7.306 | 0.208 | 9.727 | 7.98 |
| Conventional | Static | AA | 30 | 2.115 | 3.947 | 5.118 | 0.390 | 0.322 | 7.97 |
| Density | Tipped | AA | 30 | 2.325 | 3.387 | 3.675 | 0.386 | 7.323 | 8.15 |
| Conventional | Tipped | AA | 30 | 2.244 | 3.758 | 4.594 | 0.246 | 8.341 | 8.01 |
| Density | Mixed | ambient | 60 | 1.343 | 2.068 | 2.191 | 5.115 | 0.235 | 7.60 |
| Conventional | Mixed | ambient | 60 | 1.287 | 2.229 | 3.197 | 4.839 | 0.20 | 7.59 |
| Density | Static | ambient | 60 | 1.180 | 1.693 | 1.580 | 4.429 | 0.208 | 7.83 |
| Conventional | Static | ambient | 60 | 0.967 | 1.169 | 0.659 | 2.099 | 0.229 | 7.66 |
| Density | Tipped | ambient | 60 | 1.430 | 1.955 | 1.704 | 4.676 | 0.277 | 7.68 |

TABLE 6A-continued

| Order of Addition | Mixing | Storage | Storage Time (Days) | Median PS (μm) | Mean PS (μm) | Std Dev (μm) | d10 (μm) | d90 (μm) | pH |
|---|---|---|---|---|---|---|---|---|---|
| Conventional | Tipped | ambient | 60 | 1.207 | 1.696 | 1.57 | 4.443 | 0.221 | 7.70 |
| Density | Mixed | AA | 60 | 1.637 | 3.352 | 3.378 | 8.571 | 0.255 | 7.94 |
| Conventional | Mixed | AA | 60 | 2.203 | 3.680 | 3.594 | 8.818 | 0.316 | 8.00 |
| Density | Static | AA | 60 | 4.541 | 6.122 | 6.774 | 13.750 | 0.323 | 8.14 |
| Conventional | Static | AA | 60 | 2.222 | 4.323 | 5.175 | 11.770 | 0.202 | 8.05 |
| Density | Tipped | AA | 60 | 1.635 | 4.471 | 5.807 | 14.480 | 0.201 | 7.99 |
| Conventional | Tipped | AA | 60 | 4.908 | 9.263 | 12.68 | 22.970 | 0.47 | 7.93 |
| Density | Mixed | ambient | 90 | 1.514 | 2.079 | 1.907 | 0.281 | 4.762 | 7.75 |
| Conventional | Mixed | ambient | 90 | 1.191 | 1.658 | 1.534 | 0.216 | 4.163 | 7.64 |
| Density | Static | ambient | 90 | 1.465 | 2.115 | 1.933 | 0.382 | 4.935 | 7.72 |
| Conventional | Static | ambient | 90 | 1.352 | 2.266 | 2.679 | 0.278 | 5.245 | 7.72 |
| Density | Tipped | ambient | 90 | 1.361 | 2.129 | 2.16 | 0.283 | 5.3 | 7.67 |
| Conventional | Tipped | ambient | 90 | 0.852 | 1.105 | 0.717 | 0.207 | 2.123 | 7.66 |
| Density | Mixed | AA | 90 | 3.263 | 5.171 | 6.098 | 0.328 | 11.25 | 7.94 |
| Conventional | Mixed | AA | 90 | 3.293 | 4.744 | 4.953 | 0.37 | 10.45 | 8.03 |
| Density | Static | AA | 90 | 3.073 | 4.383 | 4.659 | 0.317 | 10.35 | 8.13 |
| Conventional | Static | AA | 90 | 1.794 | 3.407 | 4.253 | 0.223 | 8.532 | 8.08 |
| Density | Tipped | AA | 90 | 2.141 | 3.869 | 4.203 | 0.219 | 10.34 | 7.96 |
| Conventional | Tipped | AA | 90 | 0.714 | 0.976 | 0.796 | 0.195 | 2.161 | 8.02 |
| Density | Mixed | ambient | 120 | 1.106 | 0.857 | 0.725 | 0.205 | 2.129 | 7.528 |
| Conventional | Mixed | ambient | 120 | 1.118 | 0.889 | 0.726 | 0.204 | 2.108 | 7.535 |
| Density | Static | ambient | 120 | 1.17 | 0.926 | 0.659 | 0.245 | 2.119 | 7.67 |
| Conventional | Static | ambient | 120 | 1.119 | 0.852 | 0.696 | 0.213 | 2.125 | 7.669 |
| Density | Tipped | ambient | 120 | 1.151 | 0.89 | 0.701 | 0.213 | 2.128 | 7.664 |
| Conventional | Tipped | ambient | 120 | 1.155 | 0.862 | 0.681 | 0.237 | 2.135 | 7.651 |
| Density | Mixed | AA | 120 | 4.227 | 2.919 | 3.899 | 0.366 | 10.24 | 7.877 |
| Conventional | Mixed | AA | 120 | 4.648 | 3.478 | 4.798 | 0.407 | 9.894 | 7.922 |
| Density | Static | AA | 120 | 1.096 | 0.812 | 0.753 | 0.195 | 2.116 | 8.036 |
| Conventional | Static | AA | 120 | 4.807 | 3.177 | 5.097 | 0.219 | 11.61 | 7.998 |
| Density | Tipped | AA | 120 | 1.012 | 0.746 | 0.775 | 0.197 | 2.124 | 7.971 |
| Conventional | Tipped | AA | 120 | 0.94 | 0.704 | 0.763 | 0.199 | 2.121 | 7.919 |

TABLE 6B

| Order of Addition | Mixing | Storage | Storage Time (Days) | Median PS (μm) | Mean PS (μm) | Std Dev (μm) | d10 (μm) | d90 (μm) | pH |
|---|---|---|---|---|---|---|---|---|---|
| Density | Mixed | ambient | 0 | 1.186 | 1.635 | 1.429 | 0.267 | 4.028 | 7.93 |
| Conventional | Mixed | ambient | 0 | 1.390 | 1.853 | 1.601 | 0.288 | 4.135 | 7.91 |
| Density | Static | ambient | 0 | 1.162 | 3.260 | 5.332 | 0.248 | 6.475 | 7.92 |
| Conventional | Static | ambient | 0 | 1.848 | 2.999 | 3.686 | 0.379 | 6.538 | 7.93 |
| Density | Tipped | ambient | 0 | 1.294 | 1.776 | 1.532 | 0.307 | 4.255 | 7.98 |
| Conventional | Tipped | ambient | 0 | 1.197 | 1.617 | 1.410 | 0.244 | 3.875 | 7.94 |
| Density | Mixed | HC | 3 | 6.025 | 7.114 | 5.300 | 13.350 | 1.667 | 8.04 |
| Conventional | Mixed | HC | 3 | 6.092 | 7.253 | 5.512 | 13.530 | 1.760 | 8.01 |
| Density | Static | HC | 3 | 2.461 | 3.583 | 3.976 | 7.822 | 0.300 | 7.94 |
| Conventional | Static | HC | 3 | 2.347 | 6.224 | 8.852 | 20.620 | 0.239 | 8.06 |
| Density | Tipped | HC | 3 | 10.380 | 21.890 | 26.820 | 58.230 | 1.001 | 8.02 |
| Conventional | Tipped | HC | 3 | 18.830 | 37.140 | 44.140 | 101.000 | 1.401 | 8.01 |
| Density | Mixed | ambient | 14 | 1.365 | 1.780 | 1.409 | 0.298 | 4.134 | 7.91 |
| Conventional | Mixed | ambient | 14 | 1.386 | 1.852 | 1.545 | 0.279 | 4.268 | 7.89 |
| Density | Static | ambient | 14 | 1.401 | 1.181 | 2.195 | 0.357 | 5.107 | 7.94 |
| Conventional | Static | ambient | 14 | 1.701 | 3.180 | 4.019 | 0.355 | 7.487 | 7.87 |
| Density | Tipped | ambient | 14 | 1.000 | 1.264 | 0.601 | 0.646 | 2.137 | 7.89 |
| Conventional | Tipped | ambient | 14 | 1.229 | 1.660 | 1.444 | 0.246 | 4.120 | 7.86 |
| Density | Mixed | AA | 14 | 6.642 | 7.201 | 4.630 | 1.093 | 13.410 | 7.99 |
| Conventional | Mixed | AA | 14 | 5.951 | 6.496 | 4.337 | 0.864 | 12.280 | 7.98 |
| Density | Static | AA | 14 | 2.826 | 3.694 | 3.548 | 0.437 | 7.671 | 7.94 |
| Conventional | Static | AA | 14 | 1.121 | 1.221 | 0.669 | 0.228 | 2.122 | 7.89 |
| Density | Tipped | AA | 14 | 6.293 | 13.310 | 18.960 | 0.482 | 35.750 | 7.99 |
| Conventional | Tipped | AA | 14 | 5.741 | 13.010 | 19.720 | 0.427 | 35.550 | 7.98 |
| Density | Mixed | ambient | 30 | 0.879 | 1.147 | 0.669 | 0.231 | 2.121 | 7.83 |
| Conventional | Mixed | ambient | 30 | 1.321 | 2.137 | 2.284 | 0.248 | 5.361 | 7.81 |
| Density | Static | ambient | 30 | 1.328 | 1.807 | 1.488 | 0.314 | 4.256 | 7.82 |
| Conventional | Static | ambient | 30 | 1.295 | 1.793 | 1.554 | 0.271 | 4.354 | 7.79 |
| Density | Tipped | ambient | 30 | 1.321 | 1.886 | 1.666 | 0.348 | 4.611 | 7.74 |
| Conventional | Tipped | ambient | 30 | 1.371 | 2.082 | 2.184 | 0.298 | 4.781 | 7.82 |
| Density | Mixed | AA | 30 | 6.939 | 7.454 | 4.456 | 1.876 | 13.570 | 7.94 |
| Conventional | Mixed | AA | 30 | 6.071 | 6.670 | 4.363 | 1.125 | 12.530 | 7.92 |
| Density | Static | AA | 30 | 3.448 | 4.743 | 4.691 | 0.455 | 10.870 | 7.89 |
| Conventional | Static | AA | 30 | 2.960 | 4.509 | 4.688 | 0.471 | 10.870 | 7.87 |
| Density | Tipped | AA | 30 | 4.720 | 9.480 | 11.140 | 0.478 | 28.440 | 7.89 |

TABLE 6B-continued

| Order of Addition | Mixing | Storage | Storage Time (Days) | Median PS (μm) | Mean PS (μm) | Std Dev (μm) | d10 (μm) | d90 (μm) | pH |
|---|---|---|---|---|---|---|---|---|---|
| Conventional | Tipped | AA | 30 | 6.938 | 16.380 | 22.410 | 0.522 | 50.460 | 7.9 |
| Density | Mixed | ambient | 60 | 0.785 | 1.071 | 0.742 | 0.195 | 2.123 | 7.60 |
| Conventional | Mixed | ambient | 60 | 1.401 | 2.464 | 2.935 | 0.264 | 5.832 | 7.65 |
| Density | Static | ambient | 60 | 0.928 | 1.180 | 0.667 | 0.228 | 2.114 | 7.79 |
| Conventional | Static | ambient | 60 | 0.888 | 1.098 | 0.679 | 0.212 | 2.087 | 7.66 |
| Density | Tipped | ambient | 60 | 0.928 | 1.155 | 0.676 | 0.217 | 2.105 | 7.69 |
| Conventional | Tipped | ambient | 60 | 0.892 | 1.132 | 0.701 | 0.211 | 2.117 | 7.67 |
| Density | Mixed | AA | 60 | 5.284 | 5.977 | 4.220 | 0.675 | 12.010 | 7.77 |
| Conventional | Mixed | AA | 60 | 4.774 | 5.285 | 3.743 | 0.664 | 10.080 | 7.78 |
| Density | Static | AA | 60 | 2.966 | 4.169 | 3.959 | 0.338 | 9.878 | 7.96 |
| Conventional | Static | AA | 60 | 0.792 | 1.069 | 0.741 | 0.200 | 2.130 | 7.88 |
| Density | Tipped | AA | 60 | 6.170 | 11.260 | 13.810 | 0.450 | 29.380 | 7.84 |
| Conventional | Tipped | AA | 60 | 6.218 | 9.215 | 10.090 | 0.403 | 23.540 | 7.83 |
| Density | Mixed | ambient | 90 | 1.076 | 0.818 | 0.740 | 0.202 | 2.132 | 7.73 |
| Conventional | Mixed | ambient | 90 | 1.138 | 0.915 | 0.738 | 0.202 | 2.122 | 7.72 |
| Density | Static | ambient | 90 | 1.138 | 0.852 | 0.682 | 0.231 | 2.138 | 7.68 |
| Conventional | Static | ambient | 90 | 1.137 | 0.862 | 0.688 | 0.222 | 2.133 | 7.55 |
| Density | Tipped | ambient | 90 | 1.181 | 0.859 | 0.670 | 0.564 | 2.159 | 7.65 |
| Conventional | Tipped | ambient | 90 | 1.157 | 0.833 | 0.678 | 0.557 | 2.172 | 7.64 |
| Density | Mixed | AA | 90 | 5.799 | 5.384 | 3.741 | 0.104 | 10.990 | 7.89 |
| Conventional | Mixed | AA | 90 | 6.316 | 5.363 | 5.297 | 0.740 | 11.440 | 7.84 |
| Density | Static | AA | 90 | 1.040 | 0.764 | 0.757 | 0.197 | 2.141 | 7.97 |
| Conventional | Static | AA | 90 | 6.766 | 4.919 | 6.347 | 0.295 | 16.550 | 7.97 |
| Density | Tipped | AA | 90 | 14.740 | 7.886 | 17.650 | 0.633 | 38.590 | 7.88 |
| Conventional | Tipped | AA | 90 | 12.910 | 7.733 | 13.610 | 0.572 | 33.570 | 7.88 |
| Density | Mixed | ambient | 120 | 1.138 | 0.893 | 0.700 | 0.221 | 2.127 | 7.62 |
| Conventional | Mixed | ambient | 120 | 1.146 | 0.916 | 0.693 | 0.223 | 2.125 | 7.63 |
| Density | Static | ambient | 120 | 1.151 | 0.866 | 0.674 | 0.251 | 2.136 | 7.84 |
| Conventional | Static | ambient | 120 | 1.196 | 0.934 | 0.692 | 0.229 | 2.148 | 7.73 |
| Density | Tipped | ambient | 120 | 1.211 | 0.950 | 0.660 | 0.528 | 2.140 | 7.63 |
| Conventional | Tipped | ambient | 120 | 1.144 | 0.883 | 0.718 | 0.210 | 2.139 | 7.65 |
| Density | Mixed | AA | 120 | 5.857 | 5.279 | 4.054 | 0.859 | 10.730 | 7.92 |
| Conventional | Mixed | AA | 120 | 5.429 | 5.041 | 3.537 | 0.797 | 10.010 | 7.93 |
| Density | Static | AA | 120 | 1.089 | 0.843 | 0.722 | 0.196 | 2.069 | 8.08 |
| Conventional | Static | AA | 120 | 1.028 | 0.777 | 0.750 | 0.196 | 2.098 | 8.04 |
| Density | Tipped | AA | 120 | 1.025 | 0.765 | 0.746 | 0.206 | 2.144 | 7.89 |
| Conventional | Tipped | AA | 120 | 1.009 | 0.765 | 0.731 | 0.209 | 2.147 | 7.89 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and the associated drawings shall be interpreted as illustrative and not in a limiting sense.

What is claimed is:

1. A storage container having disposed therein a liquid formulation comprising a plurality of agrochemicals, the formulation comprising a plurality of parallel liquid layers comprising at least a first liquid layer comprising a first agrochemical, a second liquid layer comprising a second agrochemical, and one or more liquid layers that do not comprise an agrochemical, the plurality of parallel liquid layers being disposed within the container such that each layer is in contact with at least one adjacent liquid layer at a substantially horizontal interface, wherein the layered liquid formulation exhibits improved storage stability as compared to an otherwise identical formulation in the form of an unlayered mixture, and wherein the container fully encloses from about 50 to about 200 liters of the layered liquid formulation and comprises an integrated mixing apparatus.

2. The storage container of claim 1, wherein the parallel liquid layers are arranged vertically in order of decreasing density, such that the liquid layer having the highest density is at the bottom of the container.

3. The storage container of claim 1, wherein the first liquid layer is in the form of a suspension comprising a dispersed solid phase comprising the first agrochemical.

4. The storage container of claim 1, wherein the first and second liquid layers are each in the form of a suspension comprising a dispersed solid phase, the dispersed solid phase in the first layer comprising the first agrochemical and the dispersed solid phase in the second layer comprising the second agrochemical.

5. The storage container of claim 1, wherein the plurality of agrochemicals comprises one or more biologically active ingredients selected from the group consisting of *Azospirillum* extracts, *Bradyrhizobium* extracts, *Rhizobium* extracts, *Sinorhizobium* extracts, *Penicillium* extracts, and *Pseudomonas* extracts.

6. The storage container of claim 1, wherein at least one of the one or more liquid layers that do not comprise an agrochemical comprises a surfactant.

7. The storage container of claim 1, wherein at least one of the one or more liquid layers that do not comprise an agrochemical comprises a colorant.

8. The storage container of claim 1, wherein the integrated mixing apparatus comprises an impeller mounted on a rotatable shaft, and wherein the integrated mixing apparatus is adapted to allow the impeller to be rotated on the shaft within the container without opening the container.

9. The storage container of claim 1, wherein the first or second agrochemical comprises one or more pesticides selected from the group consisting of acaricides, insecticides, nematicides, fungicides, gastropodicides, herbicides, virucides, and bactericides.

10. The storage container of claim 1, wherein the container is a cylindrical drum.

11. The storage container of claim 9, wherein the plurality of agrochemicals comprises one or more fungicides selected from the group consisting of strobilurins, acylalanine fungicides, and carboxamide fungicides.

12. The storage container of claim 9, wherein the plurality of agrochemicals comprises one or more neonicotinoid insecticides.

13. The storage container of claim 9, wherein the plurality of agrochemicals comprises one or more acaricide, insecticide, or nematicide selected from the group consisting of carbamates, diamides, macrocyclic lactones, organophosphates, phenylpyrazoles, pyrethrins, spinosyns, synthetic pyrethroids, tetronic acids and tetramic acids.

* * * * *